US007649671B2

(12) United States Patent
Kothari et al.

(10) Patent No.: US 7,649,671 B2
(45) Date of Patent: Jan. 19, 2010

(54) ANALOG INTERFEROMETRIC MODULATOR DEVICE WITH ELECTROSTATIC ACTUATION AND RELEASE

(75) Inventors: Manish Kothari, Cupertino, CA (US); Lior Kogut, Sunnyvale, CA (US); Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 11/444,567

(22) Filed: Jun. 1, 2006

(65) Prior Publication Data

US 2007/0279729 A1 Dec. 6, 2007

(51) Int. Cl.
*G02B 26/00* (2006.01)
*G02B 26/08* (2006.01)
*G02F 1/29* (2006.01)

(52) U.S. Cl. ........................ 359/291; 359/223; 359/317

(58) Field of Classification Search ......... 359/290–292, 359/223–225, 245, 260–263, 298, 301–303, 359/317–318, 237, 242, 295
See application file for complete search history.

(56) References Cited

U.S. PATENT DOCUMENTS 2,534,846 A 12/1950 Ambrose et al.
3,439,973 A 4/1969 Paul et al.
3,443,854 A 5/1969 Weiss
3,653,741 A 4/1972 Marks
3,656,836 A 4/1972 de Cremoux et al.
3,725,868 A 4/1973 Malmer, Jr. et al.
3,728,030 A 4/1973 Hawes
3,813,265 A 5/1974 Marks
3,955,190 A 5/1976 Teraishi (Continued)

FOREIGN PATENT DOCUMENTS

CN 157313 5/1991

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—Scott J Sugarman
*Assistant Examiner*—Dawayne A Pinkney
(74) *Attorney, Agent, or Firm*—Knobbe, Martens Olson & Bear, LLP

(57) ABSTRACT

A microelectromechanical system (MEMS) device includes a first electrode, a second electrode electrically insulated from the first electrode, and a third electrode electrically insulated from the first electrode and the second electrode. The MEMS device also includes a support structure which separates the first electrode from the second electrode and a reflective element located and movable between a first position and a second position. The reflective element is in contact with a portion of the device when in the first position and is not in contact with the portion of the device when in the second position. An adhesive force is generated between the reflective element and the portion when the reflective element is in the first position. Voltages applied to the first electrode, the second electrode, and the third electrode at least partially reduce or counteract the adhesive force.

51 Claims, 14 Drawing Sheets

U.S. PATENT DOCUMENTS 3,955,880 A 5/1976 Lierke
4,099,854 A 7/1978 Decker et al.
4,196,396 A 4/1980 Smith
4,228,437 A 10/1980 Shelton
4,377,324 A 3/1983 Durand et al.
4,389,096 A 6/1983 Hori et al.
4,392,711 A 7/1983 Moraw et al.
4,403,248 A 9/1983 te Velde
4,441,791 A 4/1984 Hornbeck
4,445,050 A 4/1984 Marks
4,459,182 A 7/1984 te Velde
4,482,213 A 11/1984 Piliavin et al.
4,500,171 A 2/1985 Penz et al.
4,519,676 A 5/1985 te Velde
4,531,126 A 7/1985 Sadones
4,566,935 A 1/1986 Hornbeck
4,571,603 A 2/1986 Hornbeck et al.
4,596,992 A 6/1986 Hornbeck
4,615,595 A 10/1986 Hornbeck
4,662,746 A 5/1987 Hornbeck
4,663,083 A 5/1987 Marks
4,666,254 A 5/1987 Itoh et al.
4,681,403 A 7/1987 Te Velde et al.
4,710,732 A 12/1987 Hornbeck
4,748,366 A 5/1988 Taylor
4,786,128 A 11/1988 Birnbach
4,790,635 A 12/1988 Apsley
4,856,863 A 8/1989 Sampsell et al.
4,857,978 A 8/1989 Goldburt et al.
4,859,060 A 8/1989 Katagiri et al.
4,900,136 A 2/1990 Goldburt et al.
4,900,395 A 2/1990 Syverson et al.
4,937,496 A 6/1990 Neiger et al.
4,954,789 A 9/1990 Sampsell
4,956,619 A 9/1990 Hornbeck
4,965,562 A 10/1990 Verhulst
4,982,184 A 1/1991 Kirkwood
5,018,256 A 5/1991 Hornbeck
5,022,745 A 6/1991 Zahowski et al.
5,028,939 A 7/1991 Hornbeck et al.
5,037,173 A 8/1991 Sampsell et al.
5,044,736 A 9/1991 Jaskie et al.
5,061,049 A 10/1991 Hornbeck
5,075,796 A 12/1991 Schildkraut et al.
5,078,479 A 1/1992 Vuilleumier
5,079,544 A 1/1992 DeMond et al.
5,083,857 A 1/1992 Hornbeck
5,091,983 A 2/1992 Lukosz
5,096,279 A 3/1992 Hornbeck et al.
5,099,353 A 3/1992 Hornbeck
5,124,834 A 6/1992 Cusano et al.
5,136,669 A 8/1992 Gerdt
5,142,405 A 8/1992 Hornbeck
5,142,414 A 8/1992 Koehler
5,153,771 A 10/1992 Link et al.
5,162,787 A 11/1992 Thompson et al.
5,168,406 A 12/1992 Nelson
5,170,156 A 12/1992 DeMond et al.
5,170,283 A 12/1992 O'Brien et al.
5,172,262 A 12/1992 Hornbeck
5,179,274 A 1/1993 Sampsell
5,192,395 A 3/1993 Boysel et al.
5,192,946 A 3/1993 Thompson et al.
5,206,629 A 4/1993 DeMond et al.
5,212,582 A 5/1993 Nelson
5,214,419 A 5/1993 DeMond et al.
5,214,420 A 5/1993 Thompson et al.
5,216,537 A 6/1993 Hornbeck
5,226,099 A 7/1993 Mignardi et al.
5,228,013 A 7/1993 Bik
5,231,532 A 7/1993 Magel et al.
5,233,385 A 8/1993 Sampsell
5,233,456 A 8/1993 Nelson
5,233,459 A 8/1993 Bozler et al.
5,254,980 A 10/1993 Hendrix et al.
5,272,473 A 12/1993 Thompson et al.
5,278,652 A 1/1994 Urbanus et al.
5,280,277 A 1/1994 Hornbeck
5,287,096 A 2/1994 Thompson et al.
5,293,272 A 3/1994 Jannson et al.
5,296,950 A 3/1994 Lin et al.
5,305,640 A 4/1994 Boysel et al.
5,311,360 A 5/1994 Bloom et al.
5,312,513 A 5/1994 Florence et al.
5,315,370 A 5/1994 Bulow
5,323,002 A 6/1994 Sampsell et al.
5,324,683 A 6/1994 Fitch et al.
5,325,116 A 6/1994 Sampsell
5,326,430 A 7/1994 Cronin et al.
5,327,286 A 7/1994 Sampsell et al.
5,331,454 A 7/1994 Hornbeck
5,339,116 A 8/1994 Urbanus et al.
5,345,328 A 9/1994 Fritz et al.
5,355,357 A 10/1994 Yamamori et al.
5,358,601 A 10/1994 Cathey
5,365,283 A 11/1994 Doherty et al.
5,381,232 A 1/1995 Van Wijk
5,381,253 A 1/1995 Sharp et al.
5,401,983 A 3/1995 Jokerst et al.
5,411,769 A 5/1995 Hornbeck
5,444,566 A 8/1995 Gale et al.
5,446,479 A 8/1995 Thompson et al.
5,448,314 A 9/1995 Heimbuch et al.
5,452,024 A * 9/1995 Sampsell .................... 348/755
5,454,906 A 10/1995 Baker et al.
5,457,493 A 10/1995 Leddy et al.
5,457,566 A 10/1995 Sampsell et al.
5,459,602 A 10/1995 Sampsell
5,459,610 A 10/1995 Bloom et al.
5,461,411 A 10/1995 Florence et al.
5,471,341 A 11/1995 Warde et al.
5,474,865 A 12/1995 Vasudev
5,489,952 A 2/1996 Gove et al.
5,497,172 A 3/1996 Doherty et al.
5,497,197 A 3/1996 Gove et al.
5,499,037 A 3/1996 Nakagawa et al.
5,499,062 A 3/1996 Urbanus
5,500,635 A 3/1996 Mott
5,500,761 A 3/1996 Goossen et al.
5,506,597 A 4/1996 Thompson et al.
5,515,076 A 5/1996 Thompson et al.
5,517,347 A 5/1996 Sampsell
5,523,803 A 6/1996 Urbanus et al.
5,526,051 A 6/1996 Gove et al.
5,526,172 A 6/1996 Kanack
5,526,327 A 6/1996 Cordova, Jr.
5,526,688 A 6/1996 Boysel et al.
5,535,047 A 7/1996 Hornbeck
5,548,301 A 8/1996 Kornher et al.
5,551,293 A 9/1996 Boysel et al.
5,552,924 A 9/1996 Tregilgas
5,552,925 A 9/1996 Worley
5,559,358 A 9/1996 Burns et al.
5,563,398 A 10/1996 Sampsell
5,567,334 A 10/1996 Baker et al.
5,570,135 A 10/1996 Gove et al.
5,579,149 A 11/1996 Moret et al.
5,581,272 A 12/1996 Conner et al.
5,583,688 A 12/1996 Hornbeck
5,589,852 A 12/1996 Thompson et al.
5,597,736 A 1/1997 Sampsell
5,600,383 A 2/1997 Hornbeck
5,602,671 A 2/1997 Hornbeck
5,606,441 A 2/1997 Florence et al.

5,608,468 A 3/1997 Gove et al.
5,610,438 A 3/1997 Wallace et al.
5,610,624 A 3/1997 Bhuva
5,610,625 A 3/1997 Sampsell
5,614,937 A 3/1997 Nelson
5,619,059 A 4/1997 Li et al.
5,619,365 A 4/1997 Rhoads et al.
5,619,366 A 4/1997 Rhoads et al.
5,629,790 A 5/1997 Neukermans et al.
5,633,652 A 5/1997 Kanbe et al.
5,636,052 A 6/1997 Arney et al.
5,636,185 A 6/1997 Brewer et al.
5,638,084 A 6/1997 Kalt
5,638,946 A 6/1997 Zavracky
5,641,391 A 6/1997 Hunter et al.
5,646,729 A 7/1997 Koskinen et al.
5,646,768 A 7/1997 Kaeiyama
5,650,881 A 7/1997 Hornbeck
5,654,741 A 8/1997 Sampsell et al.
5,657,099 A 8/1997 Doherty et al.
5,659,374 A 8/1997 Gale, Jr. et al.
5,661,591 A 8/1997 Lin et al.
5,661,592 A 8/1997 Bornstein et al.
5,665,997 A 9/1997 Weaver et al.
5,673,139 A 9/1997 Johnson
5,683,591 A 11/1997 Offenberg
5,703,710 A 12/1997 Brinkman et al.
5,710,656 A 1/1998 Goosen
5,726,480 A 3/1998 Pister
5,739,945 A 4/1998 Tayebati
5,740,150 A 4/1998 Uchimaru et al.
5,745,193 A 4/1998 Urbanus et al.
5,745,281 A 4/1998 Yi et al.
5,751,469 A 5/1998 Arney et al.
5,771,116 A 6/1998 Miller et al.
5,784,190 A 7/1998 Worley
5,784,212 A 7/1998 Hornbeck
5,786,927 A 7/1998 Greywall et al.
5,793,504 A 8/1998 Stoll
5,808,780 A 9/1998 McDonald
5,808,781 A 9/1998 Arney et al.
5,818,095 A 10/1998 Sampsell
5,825,528 A 10/1998 Goosen
5,835,255 A 11/1998 Miles
5,838,484 A 11/1998 Goossen et al.
5,842,088 A 11/1998 Thompson
5,867,302 A 2/1999 Fleming
5,905,482 A 5/1999 Hughes et al.
5,912,758 A 6/1999 Knipe et al.
5,943,158 A 8/1999 Ford et al.
5,959,763 A 9/1999 Bozler et al.
5,986,796 A 11/1999 Miles
5,994,174 A 11/1999 Carey et al.
6,028,689 A 2/2000 Michalicek et al.
6,028,690 A 2/2000 Carter et al.
6,038,056 A 3/2000 Florence et al.
6,040,937 A 3/2000 Miles
6,046,840 A 4/2000 Huibers
6,049,317 A 4/2000 Thompson et al.
6,055,090 A 4/2000 Miles
6,056,406 A 5/2000 Park et al.
6,061,075 A 5/2000 Nelson et al.
6,097,145 A 8/2000 Kastalsky et al.
6,099,132 A 8/2000 Kaeriyama
6,100,872 A 8/2000 Aratani et al.
6,113,239 A 9/2000 Sampsell et al.
6,147,790 A 11/2000 Meier et al.
6,158,156 A 12/2000 Patrick
6,160,833 A 12/2000 Floyd et al.
6,171,945 B1 1/2001 Mandal et al.
6,172,797 B1 1/2001 Huibers
6,180,428 B1 1/2001 Peeters et al.
6,195,196 B1 2/2001 Kimura et al.
6,198,565 B1 * 3/2001 Iseki et al. .................. 359/224
6,201,633 B1 3/2001 Peeters et al.
6,215,221 B1 4/2001 Cabuz et al.
6,232,936 B1 5/2001 Gove et al.
6,239,777 B1 5/2001 Sugahara et al.
6,243,149 B1 6/2001 Swanson et al.
6,262,697 B1 7/2001 Stephenson
6,282,010 B1 8/2001 Sulzbach et al.
6,288,472 B1 9/2001 Cabuz et al.
6,288,824 B1 9/2001 Kastalsky
6,295,154 B1 9/2001 Laor et al.
6,323,982 B1 11/2001 Hornbeck
6,327,071 B1 12/2001 Kimura
6,331,909 B1 12/2001 Dunfield
6,335,831 B2 1/2002 Kowarz et al.
6,356,254 B1 3/2002 Kimura
6,356,378 B1 3/2002 Huibers
6,358,021 B1 3/2002 Cabuz
6,376,787 B1 4/2002 Martin et al.
6,384,952 B1 5/2002 Clark et al.
6,407,851 B1 6/2002 Islam et al.
6,417,868 B1 7/2002 Bock et al.
6,433,917 B1 8/2002 Mei et al.
6,438,282 B1 8/2002 Takeda et al.
6,447,126 B1 9/2002 Hornbeck
6,449,084 B1 9/2002 Guo
6,452,712 B2 9/2002 Atobe et al.
6,456,420 B1 9/2002 Goodwin-Johansson
6,465,355 B1 10/2002 Horsley
6,466,190 B1 10/2002 Evoy
6,466,354 B1 10/2002 Gudeman
6,466,358 B2 10/2002 Tew
6,473,072 B1 10/2002 Comiskey et al.
6,473,221 B2 * 10/2002 Ueda et al. .................. 359/298
6,473,274 B1 10/2002 Maimone et al.
6,480,177 B2 11/2002 Doherty et al.
6,496,122 B2 12/2002 Sampsell
6,545,335 B1 4/2003 Chua et al.
6,548,908 B2 4/2003 Chua et al.
6,549,338 B1 4/2003 Wolverton et al.
6,552,840 B2 4/2003 Knipe
6,556,338 B2 4/2003 Han et al.
6,574,033 B1 6/2003 Chui et al.
6,589,625 B1 7/2003 Kothari et al.
6,597,490 B2 7/2003 Tayebati
6,600,201 B2 7/2003 Hartwell et al.
6,606,175 B1 8/2003 Sampsell et al.
6,608,268 B1 8/2003 Goldsmith
6,624,944 B1 9/2003 Wallace et al.
6,625,047 B2 9/2003 Coleman, Jr.
6,630,786 B2 10/2003 Cummings et al.
6,632,698 B2 10/2003 Ives
6,635,919 B1 10/2003 Melendez et al.
6,643,069 B2 11/2003 Dewald
6,650,455 B2 11/2003 Miles
6,657,832 B2 12/2003 Williams et al.
6,660,656 B2 12/2003 Cheung et al.
6,661,561 B2 * 12/2003 Fitzpatrick et al. .......... 359/291
6,666,561 B1 12/2003 Blakley
6,674,090 B1 1/2004 Chua et al.
6,674,562 B1 1/2004 Miles et al.
6,680,792 B2 1/2004 Miles
6,698,295 B1 3/2004 Sherrer
6,710,908 B2 3/2004 Miles et al.
6,741,377 B2 5/2004 Miles
6,741,383 B2 5/2004 Huibers et al.
6,741,384 B1 5/2004 Martin et al.
6,741,503 B1 5/2004 Farris et al.
6,747,785 B2 6/2004 Chen et al.
6,747,800 B1 6/2004 Lin
6,775,174 B2 8/2004 Huffman et al.
6,778,155 B2 8/2004 Doherty et al.
6,794,119 B2 9/2004 Miles

| | | | |
|---|---|---|---|
| 6,809,788 | B2 | 10/2004 | Yamada et al. |
| 6,811,267 | B1 | 11/2004 | Allen et al. |
| 6,813,059 | B2 | 11/2004 | Hunter et al. |
| 6,819,469 | B1 | 11/2004 | Koba |
| 6,822,628 | B2 | 11/2004 | Dunphy et al. |
| 6,829,132 | B2 | 12/2004 | Martin et al. |
| 6,841,081 | B2 | 1/2005 | Chang et al. |
| 6,844,959 | B2 | 1/2005 | Huibers et al. |
| 6,853,129 | B1 | 2/2005 | Cummings et al. |
| 6,855,610 | B2 | 2/2005 | Tung et al. |
| 6,859,218 | B1 | 2/2005 | Luman et al. |
| 6,861,277 | B1 | 3/2005 | Monroe et al. |
| 6,862,022 | B2 | 3/2005 | Slupe |
| 6,862,029 | B1 | 3/2005 | D'Souza et al. |
| 6,867,896 | B2 | 3/2005 | Miles |
| 6,870,581 | B2 | 3/2005 | Li et al. |
| 6,870,654 | B2 | 3/2005 | Lin et al. |
| 6,882,458 | B2 | 4/2005 | Lin et al. |
| 6,882,461 | B1 | 4/2005 | Tsai et al. |
| 6,891,658 | B2 | 5/2005 | Whitehead et al. |
| 6,912,022 | B2 | 6/2005 | Lin et al. |
| 6,930,816 | B2 * | 8/2005 | Mochizuki .................. 359/291 |
| 6,940,630 | B2 | 9/2005 | Xie |
| 6,947,200 | B2 | 9/2005 | Huibers |
| 6,952,303 | B2 | 10/2005 | Lin et al. |
| 6,958,847 | B2 | 10/2005 | Lin |
| 6,959,990 | B2 | 11/2005 | Penn |
| 6,980,350 | B2 | 12/2005 | Hung et al. |
| 7,008,812 | B1 | 3/2006 | Carley |
| 7,046,422 | B2 | 5/2006 | Kimura et al. |
| 7,053,737 | B2 | 5/2006 | Schwartz et al. |
| 7,075,700 | B2 | 7/2006 | Muenter |
| 7,123,216 | B1 | 10/2006 | Miles |
| 7,184,195 | B2 | 2/2007 | Yang |
| 7,218,438 | B2 * | 5/2007 | Przybyla et al. ............. 359/290 |
| 7,236,284 | B2 | 6/2007 | Miles |
| 7,372,613 | B2 | 5/2008 | Chui et al. |
| 7,372,619 | B2 | 5/2008 | Miles |
| 7,385,762 | B2 | 6/2008 | Cummings |
| 2001/0003487 | A1 | 6/2001 | Miles |
| 2001/0028503 | A1 | 10/2001 | Flanders et al. |
| 2001/0043171 | A1 | 11/2001 | Van Gorkom et al. |
| 2002/0014579 | A1 | 2/2002 | Dunfield |
| 2002/0015215 | A1 | 2/2002 | Miles |
| 2002/0021485 | A1 | 2/2002 | Pilossof |
| 2002/0024711 | A1 | 2/2002 | Miles |
| 2002/0027636 | A1 | 3/2002 | Yamada |
| 2002/0054424 | A1 | 5/2002 | Miles |
| 2002/0070931 | A1 | 6/2002 | Ishikawa |
| 2002/0075555 | A1 | 6/2002 | Miles |
| 2002/0114558 | A1 | 8/2002 | Nemirovsky |
| 2002/0126364 | A1 | 9/2002 | Miles |
| 2002/0139981 | A1 | 10/2002 | Young |
| 2002/0146200 | A1 | 10/2002 | Kurdle et al. |
| 2002/0149828 | A1 | 10/2002 | Miles |
| 2002/0149850 | A1 | 10/2002 | Heffner et al. |
| 2002/0167072 | A1 | 11/2002 | Andosca |
| 2002/0167730 | A1 | 11/2002 | Needham et al. |
| 2002/0186483 | A1 | 12/2002 | Hagelin et al. |
| 2003/0015936 | A1 | 1/2003 | Yoon et al. |
| 2003/0016428 | A1 | 1/2003 | Kato et al. |
| 2003/0029705 | A1 | 2/2003 | Qiu et al. |
| 2003/0035196 | A1 | 2/2003 | Walker |
| 2003/0043157 | A1 | 3/2003 | Miles |
| 2003/0053078 | A1 | 3/2003 | Missey et al. |
| 2003/0072070 | A1 | 4/2003 | Miles |
| 2003/0156315 | A1 | 8/2003 | Li et al. |
| 2003/0202264 | A1 | 10/2003 | Weber et al. |
| 2003/0202265 | A1 | 10/2003 | Reboa et al. |
| 2003/0202266 | A1 | 10/2003 | Ring et al. |
| 2003/0210453 | A1 * | 11/2003 | Noda ......................... 359/290 |
| 2003/0210851 | A1 | 11/2003 | Fu et al. |
| 2004/0008396 | A1 | 1/2004 | Stappaerts |
| 2004/0008438 | A1 | 1/2004 | Sato |
| 2004/0027671 | A1 | 2/2004 | Wu et al. |
| 2004/0027701 | A1 | 2/2004 | Ishikawa |
| 2004/0043552 | A1 | 3/2004 | Strumpell et al. |
| 2004/0051929 | A1 | 3/2004 | Sampsell et al. |
| 2004/0056742 | A1 | 3/2004 | Dabbaj |
| 2004/0058532 | A1 | 3/2004 | Miles et al. |
| 2004/0075967 | A1 | 4/2004 | Lynch et al. |
| 2004/0080035 | A1 | 4/2004 | Delapierre |
| 2004/0080807 | A1 | 4/2004 | Chen et al. |
| 2004/0100594 | A1 | 5/2004 | Huibers et al. |
| 2004/0100677 | A1 | 5/2004 | Huibers et al. |
| 2004/0100680 | A1 | 5/2004 | Huibers et al. |
| 2004/0124483 | A1 | 7/2004 | Partridge et al. |
| 2004/0125281 | A1 | 7/2004 | Lin et al. |
| 2004/0125282 | A1 | 7/2004 | Lin et al. |
| 2004/0125347 | A1 | 7/2004 | Patel et al. |
| 2004/0136045 | A1 | 7/2004 | Tran |
| 2004/0140557 | A1 | 7/2004 | Sun et al. |
| 2004/0145049 | A1 | 7/2004 | McKinnell et al. |
| 2004/0145811 | A1 | 7/2004 | Lin et al. |
| 2004/0147056 | A1 | 7/2004 | McKinnell et al. |
| 2004/0147198 | A1 | 7/2004 | Lin et al. |
| 2004/0148009 | A1 | 7/2004 | Buzzard et al. |
| 2004/0150939 | A1 | 8/2004 | Huff |
| 2004/0160143 | A1 | 8/2004 | Shreeve et al. |
| 2004/0174583 | A1 | 9/2004 | Chen et al. |
| 2004/0175577 | A1 | 9/2004 | Lin et al. |
| 2004/0179281 | A1 | 9/2004 | Reboa |
| 2004/0179445 | A1 | 9/2004 | Park et al. |
| 2004/0184134 | A1 | 9/2004 | Makigaki |
| 2004/0184766 | A1 | 9/2004 | Kim et al. |
| 2004/0201908 | A1 | 10/2004 | Kaneko |
| 2004/0207897 | A1 | 10/2004 | Lin |
| 2004/0209192 | A1 | 10/2004 | Lin et al. |
| 2004/0209195 | A1 | 10/2004 | Lin |
| 2004/0212026 | A1 | 10/2004 | Van Brooklin et al. |
| 2004/0217378 | A1 | 11/2004 | Martin et al. |
| 2004/0217919 | A1 | 11/2004 | Piehl et al. |
| 2004/0218251 | A1 | 11/2004 | Piehl et al. |
| 2004/0218334 | A1 | 11/2004 | Martin et al. |
| 2004/0218341 | A1 | 11/2004 | Martin et al. |
| 2004/0227493 | A1 | 11/2004 | Van Brocklin et al. |
| 2004/0233503 | A1 | 11/2004 | Kimura |
| 2004/0240032 | A1 | 12/2004 | Miles |
| 2004/0240138 | A1 | 12/2004 | Martin et al. |
| 2004/0245588 | A1 | 12/2004 | Nikkel et al. |
| 2004/0263944 | A1 | 12/2004 | Miles et al. |
| 2005/0001828 | A1 | 1/2005 | Martin et al. |
| 2005/0002082 | A1 | 1/2005 | Miles |
| 2005/0003667 | A1 | 1/2005 | Lin et al. |
| 2005/0014374 | A1 | 1/2005 | Partridge et al. |
| 2005/0024557 | A1 | 2/2005 | Lin |
| 2005/0035699 | A1 | 2/2005 | Tsai |
| 2005/0036095 | A1 | 2/2005 | Yeh et al. |
| 2005/0036192 | A1 | 2/2005 | Lin et al. |
| 2005/0038950 | A1 | 2/2005 | Adelmann |
| 2005/0042117 | A1 | 2/2005 | Lin |
| 2005/0046919 | A1 | 3/2005 | Taguchi et al. |
| 2005/0046922 | A1 | 3/2005 | Lin et al. |
| 2005/0046948 | A1 | 3/2005 | Lin |
| 2005/0057442 | A1 | 3/2005 | Way |
| 2005/0068583 | A1 | 3/2005 | Gutkowski et al. |
| 2005/0068605 | A1 | 3/2005 | Tsai |
| 2005/0068606 | A1 | 3/2005 | Tsai |
| 2005/0069209 | A1 | 3/2005 | Damera-Vankata et al. |
| 2005/0078348 | A1 | 4/2005 | Lin |
| 2005/0117196 | A1 * | 6/2005 | Kimura et al. ............. 359/291 |
| 2005/0157364 | A1 | 7/2005 | Lin |
| 2005/0168849 | A1 | 8/2005 | Lin |
| 2005/0179378 | A1 | 8/2005 | Oooka et al. |
| 2005/0195462 | A1 | 9/2005 | Lin |
| 2005/0195467 | A1 | 9/2005 | Kothari et al. |

| | | | | |
|---|---|---|---|---|
| 2005/0202649 | A1 | 9/2005 | Hung et al. | |
| 2005/0249966 | A1 | 11/2005 | Tung et al. | |
| 2006/0007517 | A1 | 1/2006 | Tsai | |
| 2006/0017379 | A1 | 1/2006 | Su et al. | |
| 2006/0017689 | A1 | 1/2006 | Faase et al. | |
| 2006/0024880 | A1 | 2/2006 | Chui et al. | |
| 2006/0033975 | A1 | 2/2006 | Miles | |
| 2006/0044654 | A1 | 3/2006 | Vandorpe et al. | |
| 2006/0065940 | A1 | 3/2006 | Kothari | |
| 2006/0066599 | A1 | 3/2006 | Chui | |
| 2006/0066640 | A1 | 3/2006 | Kothari et al. | |
| 2006/0066641 | A1 | 3/2006 | Gally et al. | |
| 2006/0066935 | A1 | 3/2006 | Cummings | |
| 2006/0066936 | A1 | 3/2006 | Chui et al. | |
| 2006/0067643 | A1 | 3/2006 | Chui | |
| 2006/0067649 | A1 | 3/2006 | Tung et al. | |
| 2006/0067651 | A1 | 3/2006 | Chui | |
| 2006/0077152 | A1 | 4/2006 | Chui et al. | |
| 2006/0077155 | A1 | 4/2006 | Chui et al. | |
| 2006/0077156 | A1 | 4/2006 | Chui et al. | |
| 2006/0077507 | A1 | 4/2006 | Chui et al. | |
| 2006/0077508 | A1 | 4/2006 | Chui et al. | |
| 2006/0077515 | A1 | 4/2006 | Cummings | |
| 2006/0077516 | A1 | 4/2006 | Kothari | |
| 2006/0077527 | A1 | 4/2006 | Cummings | |
| 2006/0077533 | A1 | 4/2006 | Miles et al. | |
| 2006/0079048 | A1 | 4/2006 | Sampsell | |
| 2006/0139723 | A9 | 6/2006 | Miles | |
| 2006/0220160 | A1 | 10/2006 | Miles | |
| 2006/0262126 | A1 | 11/2006 | Miles | |
| 2006/0262380 | A1 | 11/2006 | Miles | |
| 2006/0268388 | A1 | 11/2006 | Miles | |
| 2006/0274074 | A1 | 12/2006 | Miles | |
| 2006/0274398 | A1 | 12/2006 | Chou | |
| 2007/0040777 | A1 | 2/2007 | Cummings | |
| 2007/0121118 | A1 | 5/2007 | Gally et al. | |
| 2007/0177247 | A1 | 8/2007 | Miles | |
| 2007/0194630 | A1 | 8/2007 | Mignard et al. | |
| 2007/0247696 | A1 * | 10/2007 | Sasagawa et al. | 359/245 |
| 2008/0013144 | A1 | 1/2008 | Chui et al. | |
| 2008/0013145 | A1 | 1/2008 | Chui et al. | |
| 2008/0013154 | A1 | 1/2008 | Chui | |
| 2008/0037093 | A1 | 2/2008 | Miles | |
| 2008/0055705 | A1 | 3/2008 | Kothari | |
| 2008/0055706 | A1 | 3/2008 | Chui et al. | |
| 2008/0080043 | A1 | 4/2008 | Chui et al. | |
| 2008/0088904 | A1 | 4/2008 | Miles | |
| 2008/0088910 | A1 | 4/2008 | Miles | |
| 2008/0088911 | A1 | 4/2008 | Miles | |
| 2008/0088912 | A1 | 4/2008 | Miles | |
| 2008/0106782 | A1 | 5/2008 | Miles | |
| 2008/0110855 | A1 | 5/2008 | Cummings | |
| 2008/0112035 | A1 | 5/2008 | Cummings | |
| 2008/0112036 | A1 | 5/2008 | Cummings | |
| 2008/0247028 | A1 | 10/2008 | Chui et al. | |
| 2009/0068781 | A1 | 3/2009 | Tung et al. | |
| 2009/0080060 | A1 | 3/2009 | Sampsell et al. | |
| 2009/0135465 | A1 | 5/2009 | Chui | |

FOREIGN PATENT DOCUMENTS

| | | | |
|---|---|---|---|
| DE | 4108966 | A1 | 9/1992 |
| DE | 10228946 | A1 | 1/2004 |
| EP | 0 310 176 | A2 | 4/1989 |
| EP | 0 361 981 | | 4/1990 |
| EP | 0 667 548 | A1 | 8/1995 |
| EP | 0 788 005 | | 8/1997 |
| EP | 1 122 577 | | 8/2001 |
| EP | 1275997 | | 1/2003 |
| EP | 1 435 336 | | 7/2004 |
| EP | 1 473 691 | A | 11/2004 |
| EP | 1473581 | A2 | 11/2004 |
| EP | 1484635 | | 12/2004 |
| FR | 2 824 643 | A | 11/2002 |
| JP | 62 082454 | | 4/1987 |
| JP | 05275401 | A1 | 10/1993 |
| JP | 9-127439 | | 5/1997 |
| JP | 11211999 | | 8/1999 |
| JP | 11211999 | A | 11/1999 |
| JP | 2000306515 | A | 11/2000 |
| JP | 2001-221913 | | 8/2001 |
| JP | 2002-062490 | | 2/2002 |
| JP | 2002-221678 | | 8/2002 |
| JP | 2002277771 | A | 9/2002 |
| JP | 2003-340795 | | 2/2003 |
| JP | 2003-195201 | | 7/2003 |
| JP | 2003195201 | A | 7/2003 |
| JP | 2004157527 | A | 6/2004 |
| JP | 2004-212638 | | 7/2004 |
| JP | 2004-212680 | | 7/2004 |
| JP | 2004235465 | A | 8/2004 |
| JP | 2004286825 | A | 10/2004 |
| JP | 2005 279831 | | 10/2005 |
| WO | WO 95/30924 | | 11/1995 |
| WO | WO 97/17628 | | 5/1997 |
| WO | WO 99/52006 | A2 | 10/1999 |
| WO | WO 99/52006 | A3 | 10/1999 |
| WO | WO 02/079853 | | 10/2002 |
| WO | WO 03/007049 | A1 | 1/2003 |
| WO | WO 03/014789 | A2 | 2/2003 |
| WO | 03/054925 | A | 7/2003 |
| WO | WO 03/054925 | | 7/2003 |
| WO | 03/069413 | A | 8/2003 |
| WO | WO 03/069404 | | 8/2003 |
| WO | WO 03/069413 | A1 | 8/2003 |
| WO | WO 03/073151 | A1 | 9/2003 |
| WO | WO 03/085728 | A1 | 10/2003 |
| WO | WO 2004/006003 | A1 | 1/2004 |
| WO | WO 2004/026757 | A2 | 4/2004 |
| WO | WO 2005/006364 | A1 | 1/2005 |
| WO | WO 2006/014929 | | 2/2006 |
| WO | WO 2006/036392 | | 4/2006 |
| WO | WO 2006/037044 | | 4/2006 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Bass, "Handbook of Optics, vol. I, Fundamentals, Techniques, and Design, Second Edition," McGraw-Hill, Inc., New York, pp. 2.29-2.36 (1995).

Butler et al., "An Embedded Overlay Concept for Microsystems Packaging," IEEE Transactions on Advanced Packaging IEEE USA, vol. 23, No. 4, pp. 617-622, XP002379648 (2000).

Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.

Chunjun Wang et al., "Flexible curcuit-based RF MEMS Switches," MEMS. XP002379649 pp. 757-762, (Nov. 2001).

Conner, "Hybrid Color Display Using Optical Interference Filter Array," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Goossen, "MEMS-based variable optical interference devices," Optical MEMS, 2000 IEEE/LEDS Int'l. Conf. on Aug. 21-24, 2000, Piscatawny, NJ, Aug. 21, 2000, pp. 17-18.
Gosch, "West Germany Grabs the Lead in X-Ray Lithography," Electronics pp. 78-80 (Feb. 5, 1987).
Howard et al., "Nanometer-Scale Fabrication Techniques", VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics", John Wiley & Sons Inc., pp. 568-573. (date unknown).
Jerman et al., "A Miniature Fabry-Perot Interferometer with a Corrugated Silicon Diaphragm Support", (1988).
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.
Joannopoulos et al., "Molding the Flow of Light," Photonic Crystals. 1995.
Johnson "Optical Scanners", Microwave Scanning Antennas, vol. 1, p. 251-261, (1964).
Circle 36: Light over Matter, Circle No. 36 (Jun. 1993).
Miles, Mark, W., "A New Reflective FPD Technology Using Interferometric Modulation", The Proceedings of the Society for Information Display (May 11-16, 1997).
Nagami et al., "Plastic Cell Architecture: Towards Reconfigurable Computing for General-Purpose," Proc. IEEE Workshop on FPGA-based Custom Computing Machines, (1998).
Newsbreaks, "Quantum-trench devices might operate at terahertz frequencies", Laser Focus World (May 1993).
Oliner et al., "Radiating Elements and Mutual Coupling", Microwave Scanning Antennas, vol. 2, pp. 131-141, (1966).
Peerlings et al., "Long Resonator Micromachined Tunable GaAs-A1As Fabry-Perot Filter," IEEE Photonics Technology Letters, IEEE Service Center, Piscatawny, NJ, vol. 9, No. 9, Sep. 1997, pp. 1235-1237.
Raley et al., "A Fabry-Perot Microinterferometer for Visible Wavelengths", IEEE Solid-State Sensor and Actuator Workshop, Jun. 1992, Hilton Head, SC.
Schnakenberg, et al. TMAHW Etchants for Silicon Micromachining. 1991 International Conference on Solid State Sensors and Actuators-Digest of Technical Papers. pp. 815-818.
Sperger et al., "High Performance Patterned All-Dielectric Interference Colour Filter for Display Applications", SID Digest, pp. 81-83, (1994).
Stone, "Radiation and Optics, An Introduction to the Classical Theory", McGraw-Hill, pp. 340-343, (1963).
Walker, et al., "Electron-beam-tunable Interference Filter Spatial Light Modulator", Optics Letters vol. 13, No. 5, pp. 345-347, (May 1988).
Williams, et al. Etch Rates for Micromachining Processing. Journal of Microelectromechanical Systems, vol. 5, No. 4, pp. 256-259, (Dec. 1996).
Winters, et al. The etching of silicon with XeF2 vapor. Applied Physics Letters, vol. 34, No. 1, pp. 70-73, (Jan. 1979).
Winton, John M., "A novel way to capture solar energy", Chemical Week, (May 1985).
Wu, "Design of a Reflective Color LCD Using Optical Interference Reflectors", ASIA Display '95, pp. 929-931, (Oct. 1995).
Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.
Zhou et al., "Waveguide Panel Display Using Electromechanical Spatial Modulators," SID Digest, vol. XXIX, 1998.
International Search Report and Written Opinion of the International Searching Authority for PCT/US2005/005919 dated Aug. 24, 2005.
International Search Report Application No. PCT/US2005/026448, Dated Nov. 23, 2005.
International Search Report Application No. PCT/US2005/029820, Dated Dec. 27, 2005.
International Search Report Application No. PCT/US2005/030962, Dated Aug. 31, 2005.
International Search Report Application No. PCT/US2005/034465, Dated Sep. 23, 2005.
European Search Report Application No. 05255693.3—2217, dated May 24, 2006.
European Search Report Application No. EP 05 25 5673 in 9 pages, dated Jan. 23, 2006.
Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.
Fan et al., "Channel Drop Filters in Photonic Crystals, "Optics Express, vol. 3, No. 1, 1998.
Fork, et al., "P-67: Chip on Glass Bonding using StressedMetal™ Technology" Sid 05 Digest, May 24, 2005.
Kim et al., "Control of Optical Transmission Through metals Perforated With Subwave-Length Hole Arrays," Optic Letters, vol. 24, No. 4, Feb. 15, 1999, pp. 256-257.
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-3/1996.
Science and Technology, The Economist, May 22, 1999, pp. 89-90.
Taii et al., "A transparent sheet display by plastic MEMS," Journal of the SID 14(8):735-741, 2006.
IPRP for PCT/US07/012339, filed May 22, 2007.
ISR and WO for PCT/US07/012339, filed May 22, 2007.
Feenstra et al., Electrowetting displays, Liquivista BV, 16 pp., Jan. 2006.
Invitation to Pay Additional Fees for PCT/US07/012339, filed May 22, 2007.
Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.
Miles, Interferometric modulation: MOEMS as an enabling technology for high performance reflective displays, Proceedings of SPIE, vol. 4985, pp. 131-139, 2003.
Pape et al., Characteristics of the deformable mirror device for optical information processing, Optical Engineering, 22(6):676-681, Nov.-Dec. 1983.

* cited by examiner

Column Output Signals

| Row Output Signals | | $+V_{bias}$ | $-V_{bias}$ |
|---|---|---|---|
| | 0 | Stable | Stable |
| | $+\Delta V$ | Relax | Actuate |
| | $-\Delta V$ | Actuate | Relax |

ANALOG INTERFEROMETRIC MODULATOR DEVICE WITH ELECTROSTATIC ACTUATION AND RELEASE

BACKGROUND

1. Field

The invention relates to microelectromechanical system devices and in particular to analog, digital, and/or optical devices utilizing a microelectromechanical system.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

One embodiment of a microelectromechanical system (MEMS) device comprises a first electrode, a second electrode electrically insulated from the first electrode, and a third electrode electrically insulated from the first electrode and the second electrode. The MEMS device also comprises a support structure which separates the first electrode from the second electrode. The MEMS device further comprises a reflective element located and movable between a first position and a second position. The reflective element is in contact with a portion of the device when in the first position and is not in contact with the portion of the device when in the second position. An adhesive force is generated between the reflective element and the portion when the reflective element is in the first position. Voltages applied to the first electrode, the second electrode, and the third electrode at least partially reduce or counteract the adhesive force.

Another embodiment of a microelectromechanical system (MEMS) device comprises a first means for conducting electricity, a second means for conducting electricity, the second conducting means electrically insulated from the first conducting means, and a third means for conducting electricity, the third conducting means electrically insulated from the first conducting means and the second conducting means. The MEMS device further comprises means for separating the first conducting means from the second conducting means. The MEMS device further comprises means for reflecting light, the reflecting means located and movable between a first position and a second position. The reflecting means is in contact with a portion of the device when in the first position and is not in contact with the portion of the device when in the second position. An adhesive force is generated between the reflecting means and the portion when the reflecting means is in the first position. Voltages applied to the first conducting means, the second conducting means, and the third conducting means at least partially reduce or counteract the adhesive force.

An embodiment of a method of operating a microelectromechanical system (MEMS) device comprises providing a MEMS device that comprises a first electrode, a second electrode electrically insulated from the first electrode, and a third electrode electrically insulated from the first electrode and the second electrode. The MEMS device further comprises a support structure which separates the first electrode from the second electrode. The MEMS device further comprises a reflective element located and movable between a first position and a second position. The reflective element is in contact with a portion of the device when in the first position and is not in contact with the portion of the device when in the second position. An adhesive force is generated between the reflective element and the portion when the reflective element is in the first position. The method further comprises applying voltages to the first electrode, the second electrode, and the third electrode to at least partially reduce or counteract the adhesive force.

An embodiment of a method of manufacturing a microelectromechanical system (MEMS) device comprises forming a first reflective layer on a substrate, forming a sacrificial layer over the first reflective layer, removing a portion of the sacrificial layer to form an opening, and filling the opening with a dielectric material to form a post. The method further comprises forming a second reflective layer over the sacrificial layer, removing a portion of the second reflective layer and a portion of the post to form a hole, filling the hole with a conductive material to form an electrode, and removing the sacrificial layer.

DETAILED DESCRIPTION OF EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some embodiments of a MEMS device may comprise a movable element, such as a mirror or a deformable mechanical layer, which moves between a first position in which the moveable element is in contact with a portion of the device and a second position in which the moveable element is not in contact with the portion of the device. While in the first position, an adhesive force (e.g., stiction) may be generated between the movable element and the contact portion. Accordingly, it may be advantageous to provide MEMS devices and methods of operation in which the adhesive force may be at least partially reduced or counteracted while the moveable element is in the first position. In certain embodiments, the MEMS device comprises one or more electrodes configured to at least partially reduce or counteract the adhesive force on the movable element. In one embodiment, voltages may be applied to the one or more electrodes to provide an electrostatic force that at least partially counteracts the adhesive force. In other embodiments, a time-varying voltage may be used to elastically deform or oscillate the movable element so as to reduce the contact area over which the adhesive force is generated. In certain embodiments, the time-varying voltage may cause the movable element to vibrate or resonate such that the adhesive force is reduced.

Figure 1:
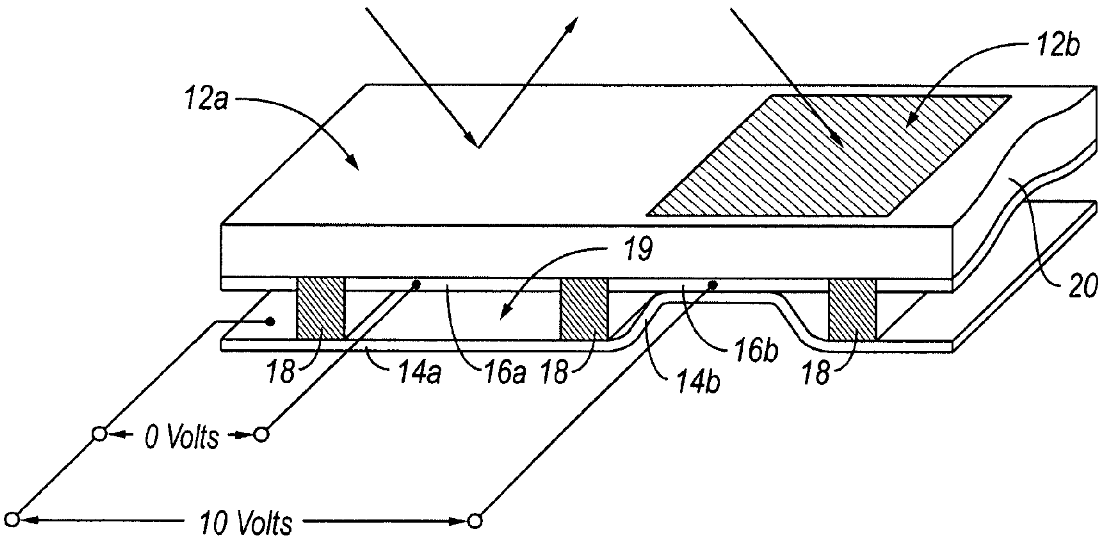
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12*a* and 12*b*. In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b*.

The optical stacks 16*a* and 16*b* (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
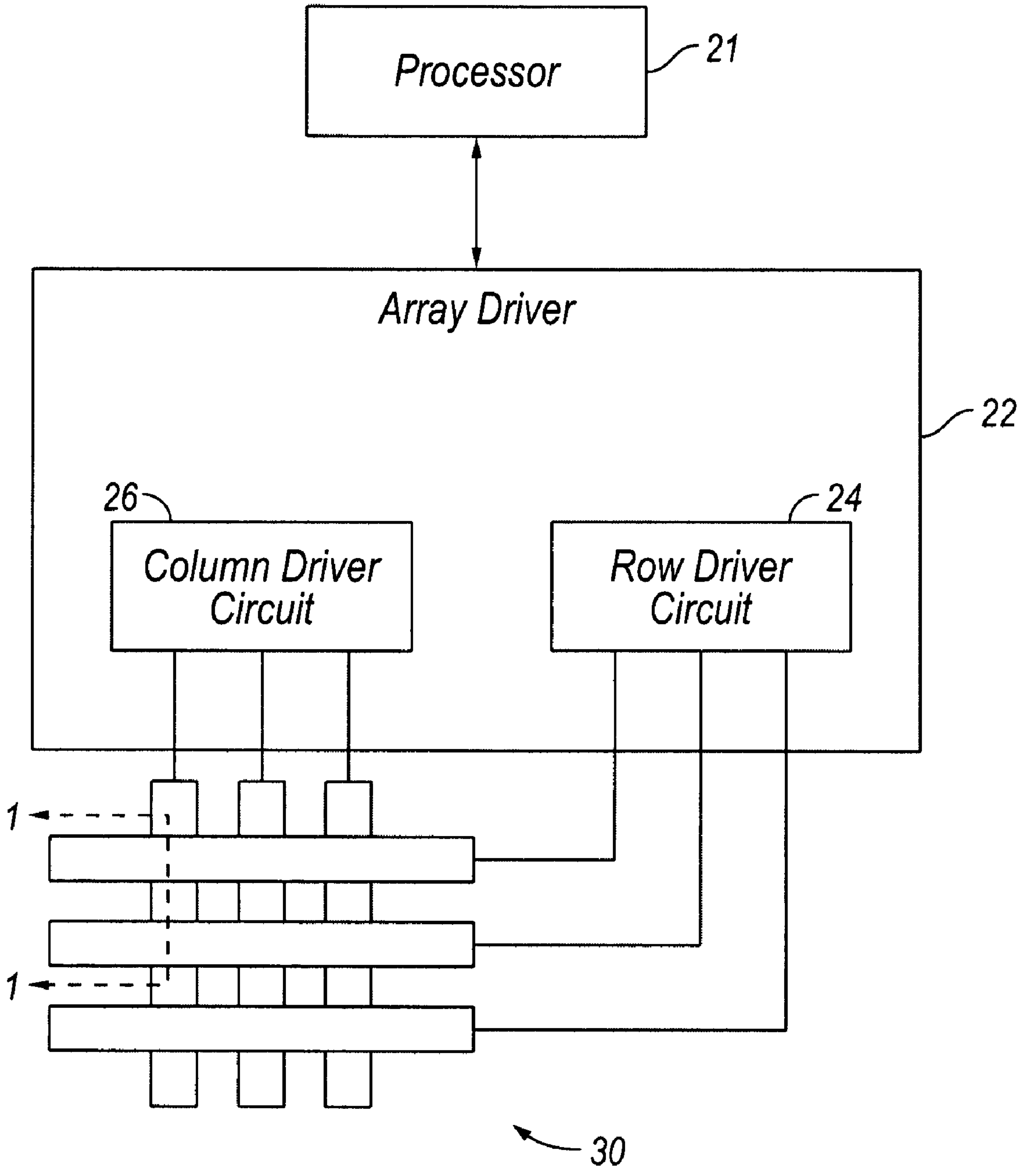
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
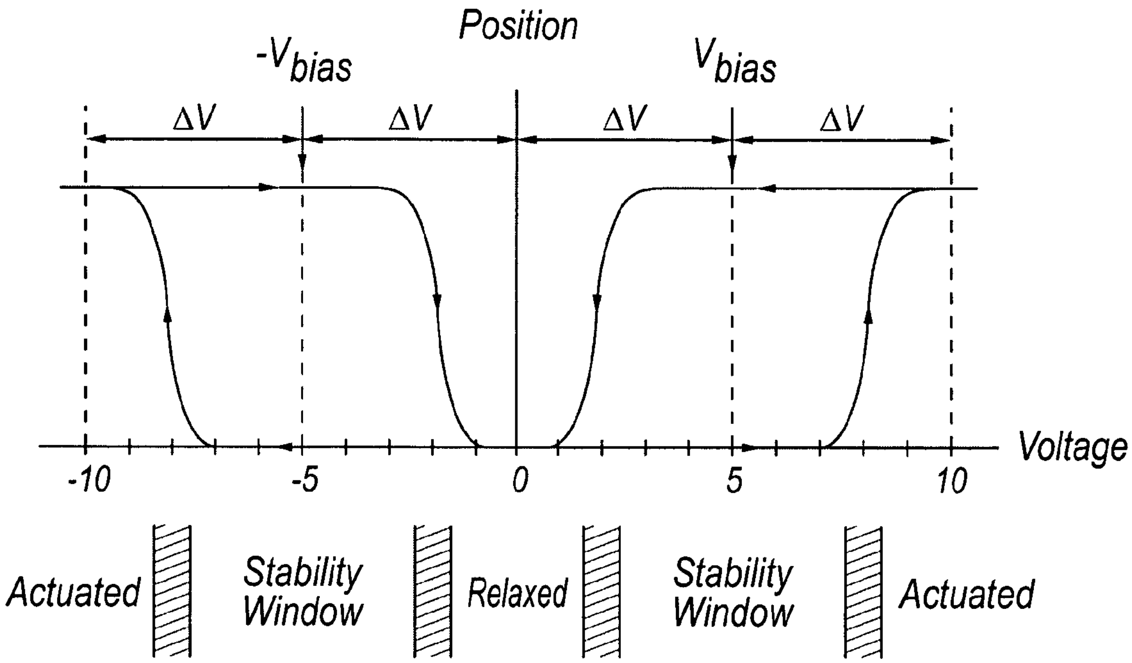
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
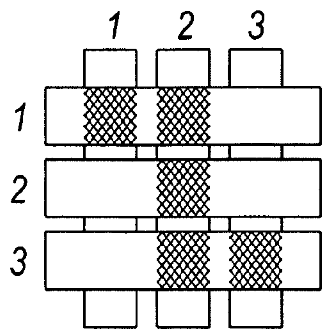
FIG. 5A illustrates one exemplary frame of display data in the 3×3 interferometric modulator display of FIG. 2.
Figure 5B:
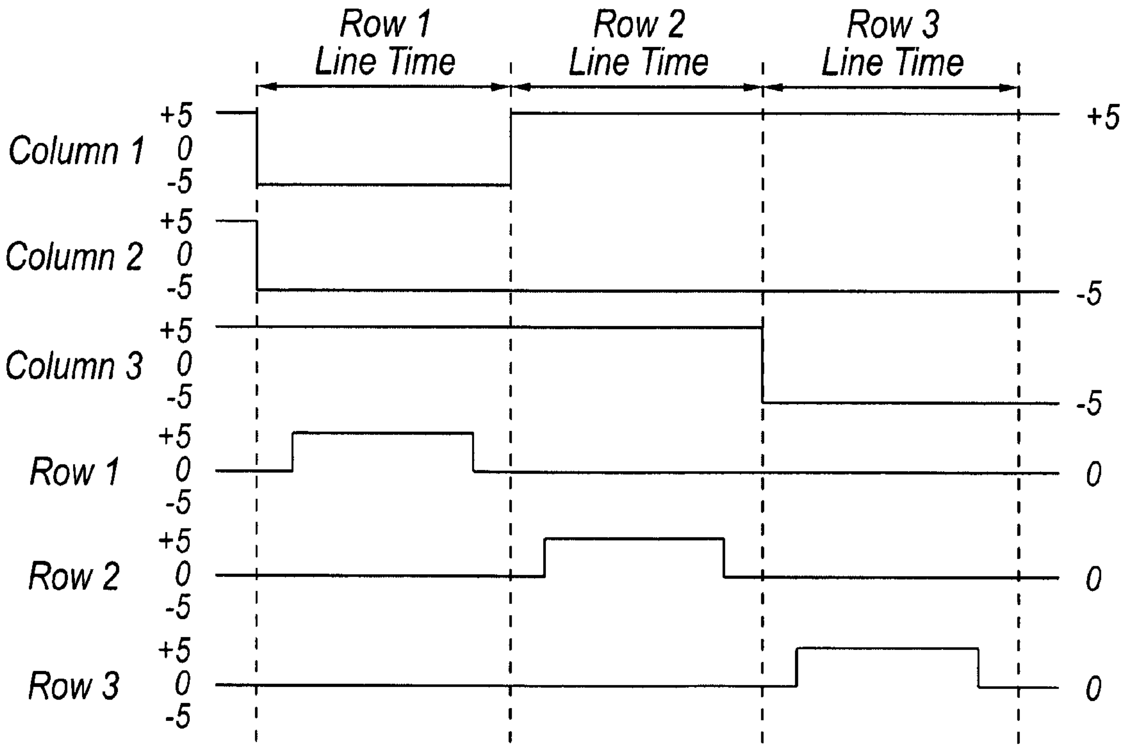
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
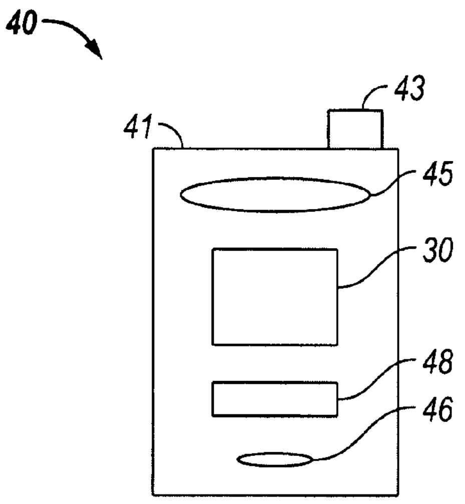
FIGS. 6A and 6B are system block diagrams illustrating an embodiment of a visual display device comprising a plurality of interferometric modulators.
Figure 6B:
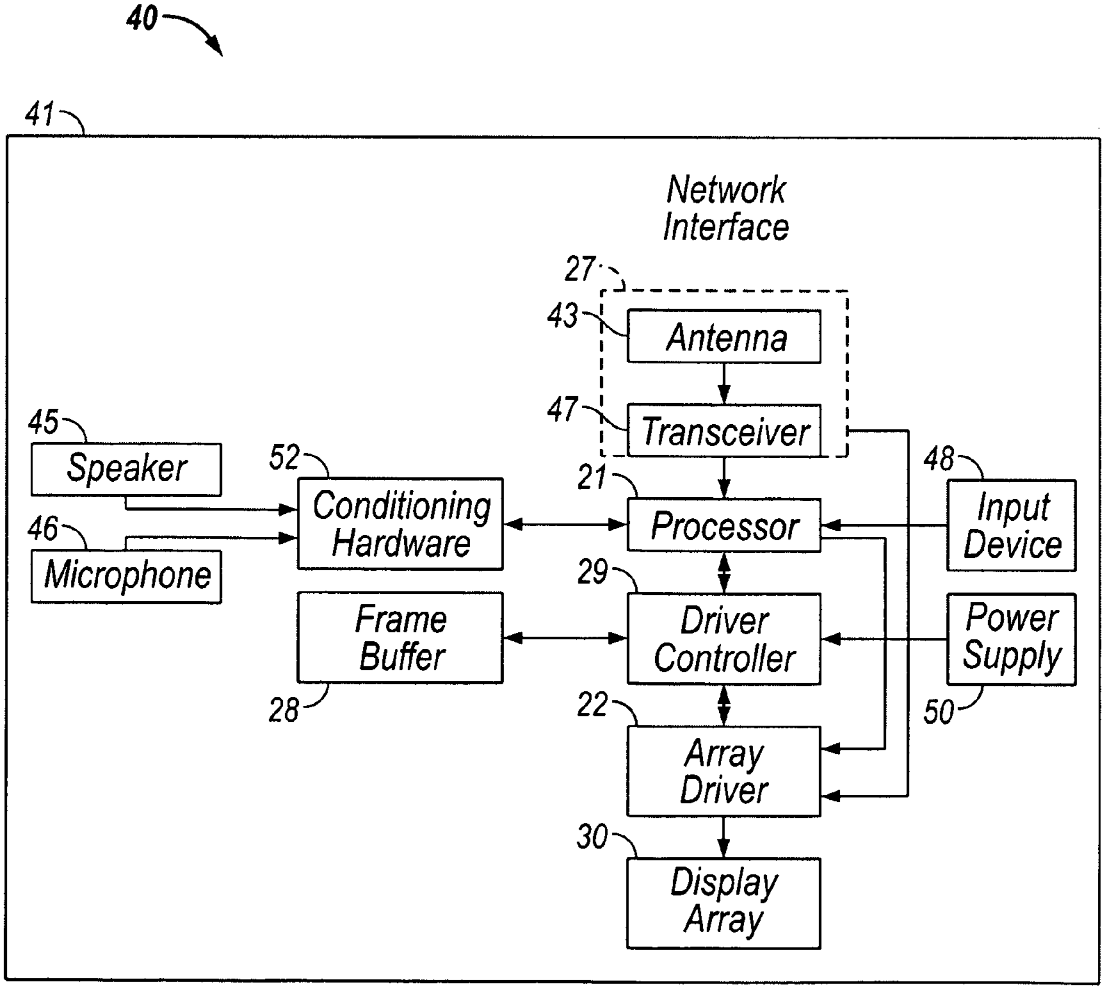

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
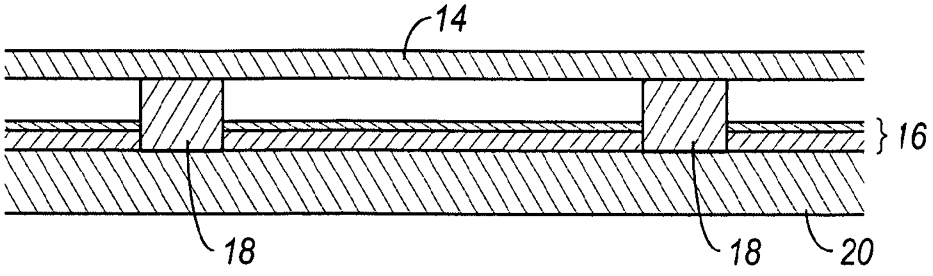
FIG. 7A is a cross section of the device of FIG. 1.
Figure 7B:
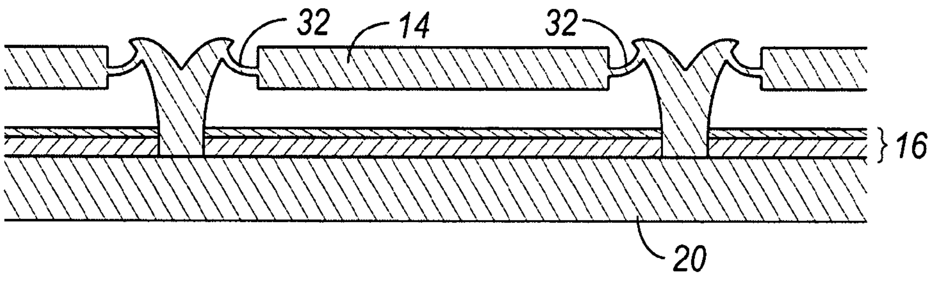
FIG. 7B is a cross section of an alternative embodiment of an interferometric modulator.
Figure 7C:
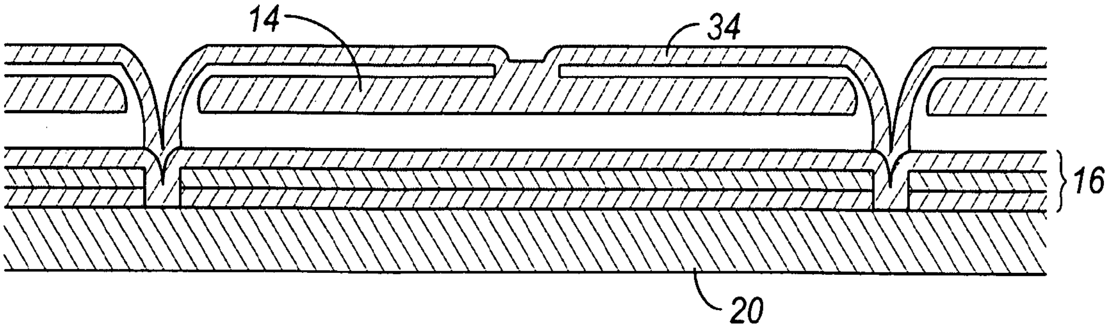
FIG. 7C is a cross section of another alternative embodiment of an interferometric modulator.
Figure 7D:
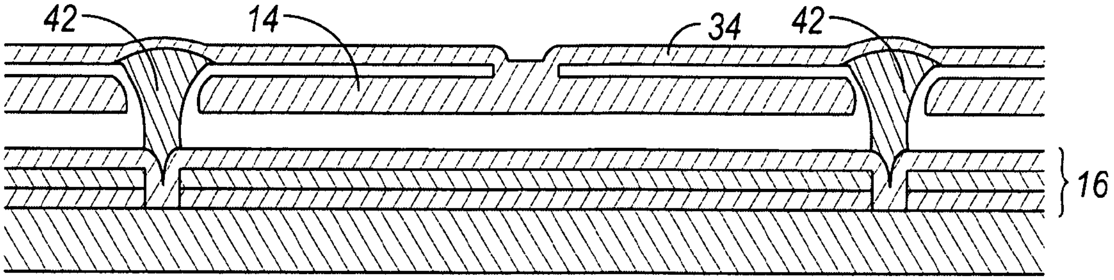
FIG. 7D is a cross section of yet another alternative embodiment of an interferometric modulator.
Figure 7E:
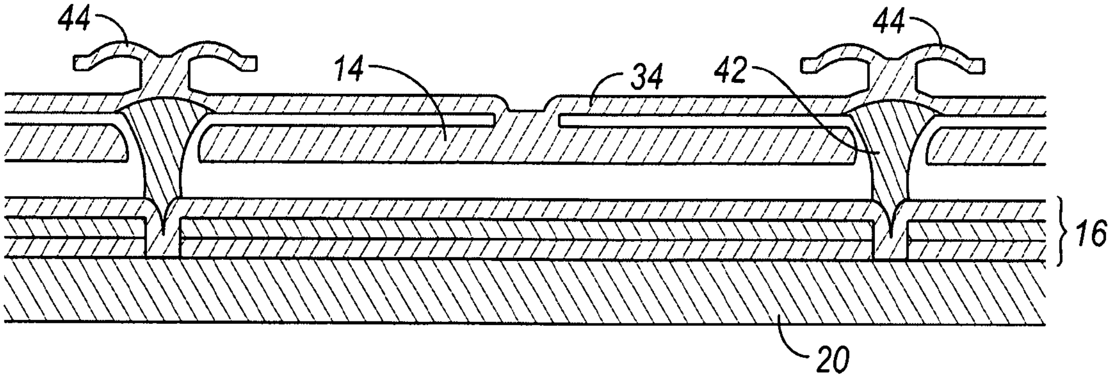
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
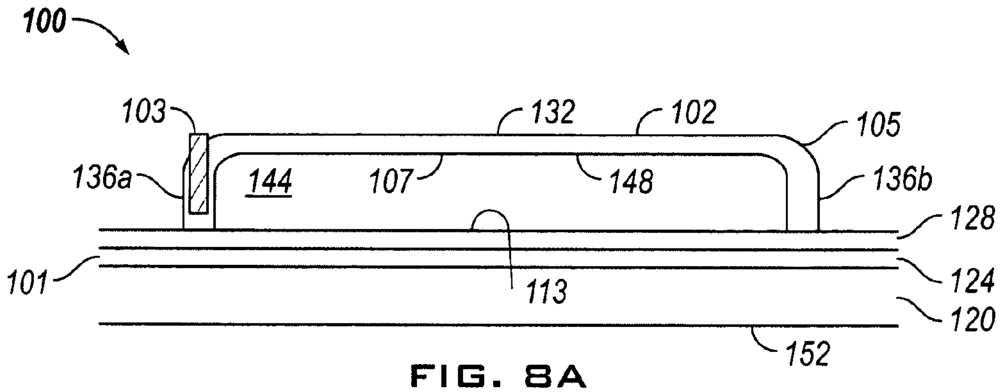
FIG. 8A is a side cross-sectional view of an embodiment of a MEMS device in a relaxed or unactuated state.
Figure 8B:
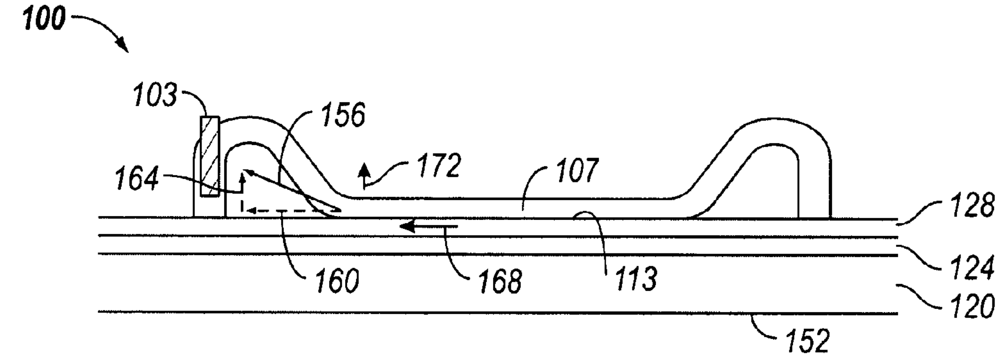
FIG. 8B is a side cross-sectional view of the MEMS device shown in FIG. 8A in an actuated or driven state.

An embodiment of a MEMS device that incorporates some of the aspects of the present invention is now discussed with reference to FIGS. 8A and 8B. The MEMS device 100 comprises a first electrode 101, a second electrode 102 that is electrically insulated from the first electrode 101, and a third electrode 103 that is electrically insulated from the first electrode 101 and the second electrode 102. The MEMS device 100 further comprises a support structure 105 which separates the first electrode 101 from the second electrode 102. The MEMS device 100 further comprises a reflective element 107 which is located and movable between a first position (as schematically illustrated by FIG. 8B) and a second position (which is schematically illustrated by FIG. 8A). In the first position, the reflective element 107 is in contact with a portion 113 of the device 100. In the second position, the reflective element 107 is not in contact with the portion 113 of the device 100. When the reflective element 107 is in the first position, an adhesive force is generated between the reflective element 107 and the portion 113 of the device 100. Voltages applied to the first electrode 101, the second electrode 102, and the third electrode 103 at least partially reduce or counteract the adhesive force.

FIG. 8A illustrates a side cross-sectional view of an embodiment of a MEMS device 100 in a relaxed or unactuated state. FIG. 8B illustrates a side cross-sectional view of the MEMS device 100 in an actuated or "driven" state. The MEMS device 100 may be formed on a transparent or translucent substrate layer 120, which in one embodiment may comprise glass. An optical layer 124 may be deposited on the substrate layer 120. The optical layer 124 may be partially transparent or translucent and partially reflective to light and may be fabricated, for example, by depositing one or more layers each of chromium and indium-tin-oxide onto the substrate 120. In some embodiments, at least a portion of the optical layer 124 is electrically conductive and comprises the first electrode 101 of the MEMS device 100. The optical layer 124 may be patterned into substantially parallel strips and may form row electrodes in a display device as described herein. In some embodiments, a dielectric layer 128 may be formed over the optical layer 124 and may comprise various transparent or translucent materials such as oxides.

In certain embodiments, a support structure 105 is disposed over the dielectric layer 128. The support structure 105 may comprise a mechanical layer 132 and one or more support posts 136*a*, 136*b*. As schematically illustrated in FIGS. 8A and 8B, in certain embodiments the mechanical layer 132 comprises the reflective element 107, and the support structure 105 is configured so that the reflective element 107 faces the dielectric layer 128 in a substantially plane parallel and spaced arrangement. The reflective element 107 and the dielectric layer 128 define a cavity 144 therebetween.

In some embodiments, at least a portion of the mechanical layer 132 is electrically conductive and comprises the second electrode 102 in the MEMS device 100. The mechanical layer 132 may be patterned into substantially parallel strips and may form column electrodes in a display device as described herein. The mechanical layer 132 may be fabricated from a deformable and highly conductive and reflective material such as a metal, which in some embodiments may be aluminum. In some embodiments, portions of the support posts 136*a*, 136*b* are electrically nonconductive and insulate the mechanical layer 132 from other portions of the device 100 (e.g., the optical layer 124). The nonconductive portions of the support posts 136*a*, 136*b* may comprise a dielectric material such as, for example, aluminum oxide. The dielectric layer 128 also serves to electrically insulate the mechanical layer 132 from the optical layer 124.

As shown in FIG. 8A, in certain embodiments, at least one of the support posts 136*a* comprises the third electrode 103. The third electrode 103 may be fabricated from an electrically conductive material such as, for example, aluminum, nickel, indium-tin-oxide, or molybdenum. Electrically nonconductive portions of the support post 136*a* may insulate the third electrode 103 from the first electrode 101 and the second electrode 102. The electrically nonconductive portions of the support post 136*a* may comprise a dielectric material.

In certain embodiments, as shown in FIGS. 8A and 8B, the mechanical layer 132 comprises a mechanically deformable material. As discussed herein with reference to FIG. 1, the mechanical layer 132 may be moved from the relaxed state to the driven state by applying a voltage difference between the first electrode 101 (e.g., the optical layer 124) and the second electrode 102 (e.g., the mechanical layer 132). If the voltage difference exceeds a threshold value, an electrostatic force causes the mechanical layer 132 to deform and move into contact with the dielectric layer 128, as shown in FIG. 8B. The dielectric layer 128 prevents shorting between the optical layer 124 and the mechanical layer 132 in the driven state and may prevent damage to the optical layer 124 and mechanical layer 132 from contact during the driven state. Additionally, the thickness of the dielectric layer 128 may be used to control the distance the mechanical layer 132 moves between the relaxed and driven states.

In some embodiments, a portion of the mechanical layer 132 may be configured to comprise the reflective element 107. For example, a portion of the lower surface 148 of the mechanical layer 132 may be made highly reflective. The reflective element 107 is configured to move between at least the second position of the relaxed state (FIG. 8A) and the first position of the driven state (FIG. 8B). In the driven state of certain embodiments, the reflective element 107 is in contact with the portion 113 of the device 100 as shown in FIG. 8B.

As further described herein in reference to FIG. 1, the device 100 may act as an "interferometric modulator." In the undriven state, light incident on a surface 152 of the substrate layer 120 is transmitted into the cavity 144. Depending on the height of the cavity 144, determined by the position of the mechanical layer 132, interference within the cavity 144 causes light of certain wavelengths to be reflected and light of other wavelengths to be absorbed. If the reflected light is in the visible portion of the electromagnetic spectrum, the surface 152 of the substrate will display a color corresponding to the reflected wavelength. In contrast, in the driven state, the height of the cavity 144 is much smaller (e.g., the reflective element 107 contacts the dielectric layer 128) than in the undriven state, and the device 100 absorbs substantially all of the incident light, or at least substantially all of the incident visible light. In the driven state, the surface 152 of the substrate will display black. By suitably configuring the size and height of the cavity 144, the device 100 may be used to form pixels in an image display device.

In the driven state, the reflective element 107 is in contact with the portion 113 of the device 100, thereby generating an adhesive force between the reflective element 107 and the portion 113. For example, in the embodiment shown in FIG. 8B, the adhesive force tends to adhere the deformed portion of the mechanical layer 132 to the dielectric layer 128.

The adhesive force may be caused by forces such as, for example, capillary, electrostatic, or van der Waals forces, or other intermolecular forces. The adhesive force depends on a range of factors including, for example, the materials used, the shape, orientation, and configuration of structures in the device 100, the roughness of the contact surfaces, and ambient humidity and pressure. The adhesive force may depend on the manner in which the structures within the device 100 are operated, for example, through impulsive motions involving large accelerations or through more gentle quasi-static motions. "Stiction" is a commonly used term that may include some of the adhesive effects discussed herein.

The process of actuating and deactuating the device 100 is described herein with reference to FIG. 3. A voltage difference may be applied between the mechanical layer 132 and the optical layer 124. As shown in FIG. 3, as the voltage difference increases above a first threshold value, an electrostatic force causes the mechanical layer 132 to deform from the relaxed state (FIG. 8A) to the driven state (FIG. 8B). As the voltage difference is reduced, the device 100 remains in the driven state until the voltage difference drops below a second threshold value. At the second threshold, the electrostatic force of attraction between the mechanical layer 132 and the optical layer 124 becomes smaller than mechanical restoring forces tending to return the mechanical layer 132 to the relaxed state. Accordingly, as the voltage drops below the second threshold, the reflective element 107 "releases" from the portion 113 with which it was in contact. In the sample embodiment of FIG. 3, the first threshold voltage is about 8 volts, and the second threshold voltage is about 2 volts. FIG. 4 shows one embodiment of an "actuation protocol" that is used to drive the MEMS device 100 through this actuation and release cycle.

The adhesive force may alter the nature of this actuation and release cycle. In some embodiments of the MEMS device 100, the adhesive force between the reflective element 107 and the portion 113 of the device 100 in contact with the reflective element 107 may be sufficiently large that adhesion inhibits, or in some cases prevents, the release of the reflective element 107 as the voltage difference drops below the second threshold. Accordingly, it is advantageous to provide architectures that at least partially reduce or counteract the adhesive force.

In certain embodiments of the MEMS device 100, voltages applied to the first electrode 101, the second electrode 102, and the third electrode 103 at least partially reduce or counteract the adhesive force while the reflective element 107 is in contact with the portion 113 of the device 100 (e.g., the first position shown in FIG. 8B). In the embodiment shown in FIGS. 8A and 8B, the support post 136*a* comprises the third electrode 103. The third electrode 103 is electrically insulated from the first electrode 101 (the optical layer 124 in FIGS. 8A and 8B) and the second electrode 102 (the mechanical layer 132 in FIGS. 8A and 8B). In certain such embodiments, a voltage applied to the third electrode 103 generates an electrostatic force 156 on the second electrode 102 (e.g., a force that attracts the mechanical layer 132 toward the third electrode 103). The electrostatic force 156 may at least partially counteract the adhesive force between the reflective element 107 and the portion 113 when the device 100 is in the first position (shown in FIG. 8B).

As illustrated in FIG. 8B, the electrostatic force 156 can be decomposed into a parallel force component 160 and a perpendicular force component 164. As used herein, the term "parallel force component" or "parallel component" refers to a component of the electrostatic force 156 that is generally parallel to the plane that includes the portion 113 of the device 100 in contact with the reflective element 107 while in the first position. The term "parallel direction" or "parallel" refers to the direction of the parallel force component 160. As used herein, the term "perpendicular force component" or "perpendicular component" refers to a component of the electrostatic force 156 that is generally perpendicular to the plane that includes the portion 113 of the device 100 in contact with the reflective element 107 while in the first position. The term "perpendicular direction" or "perpendicular" refers to the direction of the perpendicular force component 164. The perpendicular direction is at an angle of ninety degrees to the parallel direction.

Without subscribing to any particular theory, the electrostatic force 156 may at least partially reduce or counteract the adhesive force for at least several reasons. For example, in some embodiments of the device 100, the parallel force component 160 will urge the mechanical layer 132 in a direction indicated by arrow 168. This urging may reduce or break intermolecular bonds or forces responsible at least in part for the adhesive force between the reflective element 107 and the portion 113 of the device 100. In these or other embodiments, the perpendicular force component 164 similarly will urge a region of the mechanical layer 132 in a direction indicated by arrow 172, which also may reduce or break intermolecular bonds or forces responsible at least in part for the adhesive force. In some embodiments, the parallel force component 160 will cause at least a portion of the mechanical layer 132 to slide in the direction of the arrow 168, which may reduce the adhesive force and permit movement of the mechanical layer 132 in the direction of the arrow 172. In addition, in certain embodiments, the perpendicular force component 164 will cause one or more regions of the reflective element 107 to be displaced in the direction of the arrow 172. The displaced or "pulled-off" regions will lose contact with the portion 113 of the device 100, which will at least partially reduce the adhesive force. In other embodiments, the perpendicular force component 172 will cause an elastic deformation of the mechanical layer 132, which may reduce an area in which the reflective element 107 is in contact with the portion 113. In general, the adhesive force will be reduced in proportion to the reduction in contact area. In yet other embodiments, the adhesive force will be reduced or counteracted by a combination of any one or more of the aforementioned physical effects. It is appreciated that in other embodiments, the electrostatic force 156 may reduce or counteract the adhesive force for additional reasons presently known or to be discovered, and the scope of the claimed invention is not to be limited by the reasons set forth herein.

In some embodiments, one or more of the voltages applied to the first electrode 101, the second electrode 102, and the third electrode 103 may include a time-varying voltage. The time-varying voltage may cause the magnitude and/or direction of the electrostatic force 156 also to be time-varying. The variation in time of the electrostatic force 156 may facilitate the release of the reflective element 107 from the portion 113 of the device 100 (FIG. 8B). In certain embodiments, the time-varying voltage includes one or more voltage pulses of short temporal duration, for example, one or more impulses. The impulse of certain embodiments has a component generally parallel to the reflective element 107, while in other embodiments, the impulse has a component generally perpendicular to the reflective element 107. In certain such embodiments, the one or more impulses may generate a sufficiently large acceleration of the reflective element 107 that the adhesive force is reduced, and the reflective element 107 is released from the portion 113. In other embodiments, the one or more impulses may cause a portion of the reflective element 107 to undergo an elastic deformation, which as discussed above, may reduce the contact area with the portion 113 and thereby reduce the adhesive force.

In other embodiments of the MEMS device 100 shown in FIGS. 8A and 8B, one or more of the voltages applied to the first electrode 101, the second electrode 102, and the third electrode 103 includes a time-varying voltage having a frequency. For example, in one embodiment, the time-varying voltage may include a sinusoidal component that oscillates at the frequency. In other embodiments, the time-varying voltage may include voltages comprising a band of frequencies centered about the frequency. In certain embodiments, the time-varying voltages will cause a portion of the reflective element 107 to undergo an elastic oscillation, which may at least partially reduce the adhesive force while the reflective element is in the first position (FIG. 8B). In certain such embodiments, the elastic oscillation will reduce an area of the reflective element 107 that is in contact with the portion 113 of the device 100 and thereby reduce the adhesive force. In other of these certain embodiments, the elastic oscillations of the reflective element 107 will cause oscillatory accelerations of the portion 113, which may in part reduce the intermolecular forces responsible for the adhesive force.

As is well known, when a force that oscillates at a forcing frequency is applied to a mechanical system, the mechanical system will undergo elastic oscillations having an amplitude that is in direct proportion to the magnitude of the force. The amplitude of the elastic oscillations will be largest if the forcing frequency is equal to a mechanical resonant frequency of the mechanical system. In some embodiments of the MEMS device 100, the frequency of the time-varying voltage applied to at least one of the electrodes 101, 102, and 103, is selected to be substantially equal to a mechanical resonant frequency of the reflective element 107. In such embodiments, the time-varying voltage will induce elastic oscillations or vibrations in the reflective element 107 that have a substantial amplitude so as to reduce the adhesive force and to facilitate the release of the reflective element 107 from the first position shown in FIG. 8B. In other such embodiments, the frequency of the time-varying voltage will be selected so that the reflective element 107 undergoes an elastic oscillation with a sufficient amplitude that is effective to reduce the adhesive force. In some of these embodiments, the frequency that is effective at reducing the adhesive force may be different from a mechanical resonant frequency of the reflective element 107.

Voltages with various ranges of magnitudes and frequencies can be applied to the first electrode 101, the second electrode 102, and/or the third electrode 103 to at least partially reduce or counteract the adhesive force. A person of skill in the art will recognize that suitable magnitudes and frequencies of the voltages can be calculated for any configuration of the MEMS device 100. For example, in certain embodiments the voltage applied to at least one of the first electrode 101, the second electrode 102, and the third electrode 103 has a magnitude in a range from about 10 Volts to about 50 Volts, and a frequency in a range from about 100 Hz to about 10 MHz. These example ranges are not intended to be limitations on the possible ranges of suitable magnitudes and frequencies, however, and in other embodiments different magnitudes and frequencies are used.

The details of the voltages applied to the first electrode 101, the second electrode 102, and the third electrode 103 in MEMS devices that operate in accordance with the principles set forth herein may vary widely. The voltages applied to the electrodes 101, 102, and 103 may be different from the examples described herein, which are intended to serve as examples and are not intended to limit the scope of the claimed invention. For example, the magnitudes, durations, frequencies, order of application, and other characteristics of the applied voltages may differ widely. Many other voltage combinations are possible in different embodiments of the MEMS device 200.

Figure 9A:
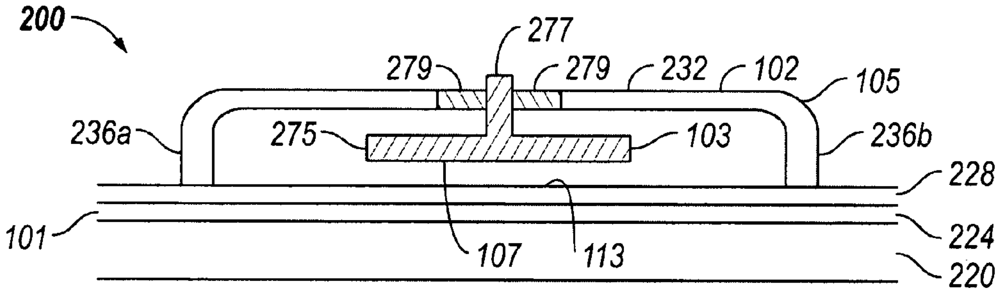
FIG. 9A is a side cross-sectional view of another embodiment of a MEMS device in a relaxed or unactuated state.
Figure 9B:
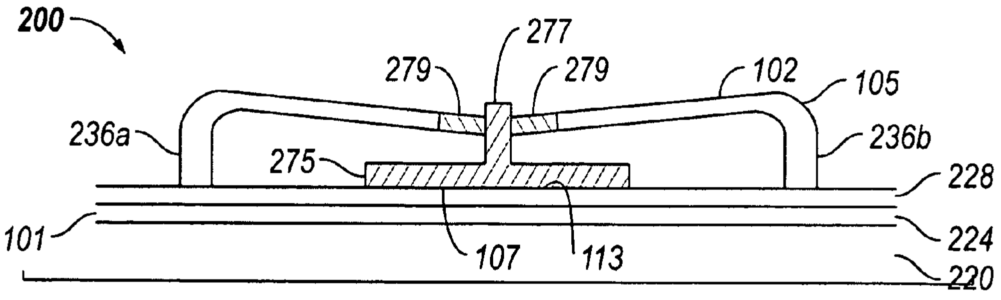
FIG. 9B is a side cross-sectional view of the MEMS device shown in FIG. 9A in an actuated or driven state.

FIGS. 9A and 9B illustrate a side cross-sectional view of another embodiment of a MEMS device 200 in the relaxed state (FIG. 9A) and the driven state (FIG. 9B). The MEMS device 200 is fabricated on a substrate layer 220 and comprises an optical layer 224, a dielectric layer 228, and a mechanical layer 232. The substrate layer 220, the optical layer 224, and the dielectric layer 228 have generally the same characteristics and features as the respective layers 120, 124, and 128 in the MEMS device 100 described with reference to FIGS. 8A and 8B. The mechanical layer 232 comprises one or more support posts 236*a*, 236*b* and has generally the same characteristics as the mechanical layer 132 except as specifically stated otherwise.

In the embodiment shown in FIGS. 9A and 9B, the reflective element 107 comprises a mirror 275 disposed between the mechanical layer 232 and the dielectric layer 228. In certain embodiments, the mirror 275 is generally parallel to and spaced from the mechanical layer 232. The reflective element 107 comprises a support connection 277 that mechanically couples the mirror 275 to the mechanical layer 232 and that provides an electrical connection to the mirror 275. In the embodiment shown in FIGS. 9A and 9B, the mirror 275 and the support connection 277 comprise an electrically conductive material such as, for example, aluminum, nickel, indium-tin-oxide, or molybdenum. A portion 279 of the mechanical layer 232 comprises an electrically nonconductive material, which is configured to provide electrical insulation between the mirror 275 and the mechanical layer 232. In this embodiment, the mirror 275 is mechanically coupled to, but electrically insulated from, the mechanical layer 232.

In the embodiment of the MEMS device shown in FIGS. 9A and 9B, the mirror 275 comprises a reflective surface of the reflective element 107, which is electrically conductive and highly reflective and which may be fabricated from a highly conductive and reflective metal such as, for example, aluminum. In this embodiment, a lower surface of the mechanical layer 232 is not configured to be reflective. In the embodiment of FIGS. 9A and 9B, the optical layer 224 comprises the first electrode 101. The support structure 105 comprises the mechanical layer 232 and the support posts 236*a* and 236*b*, and the mechanical layer 232 comprises the second electrode 102. The mirror 275 comprises the third electrode 103.

As described with reference to FIGS. 8A and 8B, a voltage difference applied between the mechanical layer 232 and the optical layer 224 can cause the mechanical layer 232 to deform from the relaxed state (FIG. 9A) to the driven state (FIG. 9B). The reflective element 107 moves from the second position when it is in the relaxed state (FIG. 9A) to the first position when it is in the driven state (FIG. 9B). In the driven state, the reflective element 107 is in contact with the portion 113 of the device 200, and an adhesive force is generated therebetween.

In some embodiments of the MEMS device 200, voltages applied to the first electrode 101, the second electrode 102, and the third electrode 103 at least partially reduce or counteract the adhesive force while the reflective element is in the first position (FIG. 9B). As further described with reference to FIGS. 8A and 8B, the applied voltages may induce elastic deformations or elastic oscillations in the reflective element 107 that at least partially reduce the adhesive force. In certain embodiments of the MEMS device 200, one or more of the voltages are time-varying. In some of these embodiments, the time-varying voltage may include a voltage comprising one or more frequencies. The frequency of the time-varying voltage may be selected to be a mechanical resonant frequency of the reflective element 107 or to increase an amplitude of an elastic oscillation induced in the reflective element 107. In other embodiments, one or more short duration voltage impulses may be applied to at least one of the electrodes 101, 102, and 103. For example, in one embodiment, one or more voltage impulses is applied to the mirror 275 while in the first position so as to induce oscillations, vibrations, or accelerations that facilitate the release of the reflective element 107 from the portion 113 of the device 200. In yet other embodiments, the voltages applied to the electrodes 101, 102, and 103 may be selected to include a combination of the aforementioned voltages. For example, in one embodiment, an oscillatory voltage is applied to one of the electrodes while one or more voltage impulses are applied to any or all of the three electrodes. The voltages applied to the electrodes 101, 102, and 103 may be different from the examples described herein and many other variations and combinations of are possible in other embodiments of the MEMS device 200.

Figure 10A:
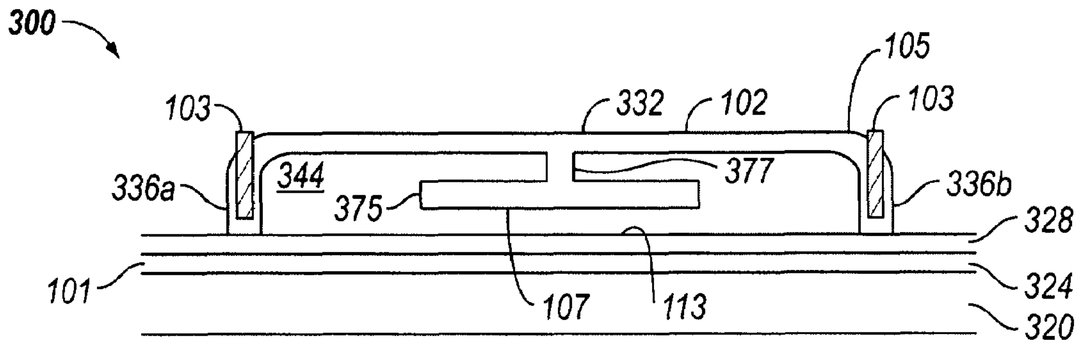
FIG. 10A is a side cross-sectional view of an additional embodiment of a MEMS device in a relaxed or unactuated state.
Figure 10B:
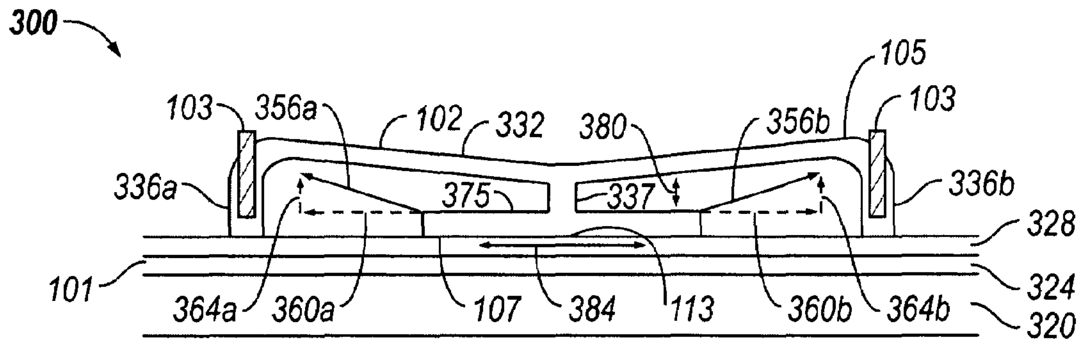
FIG. 10B is a side cross-sectional view of the MEMS device shown in FIG. 10A in an actuated or driven state.

FIGS. 10A and 10B illustrate a side cross-sectional view of another embodiment of a MEMS device 300 in the relaxed state (FIG. 10A) and the driven state (FIG. 10B). The MEMS device 300 is fabricated on a substrate layer 320 and comprises an optical layer 324, a dielectric layer 328, and a mechanical layer 332. The substrate layer 320, the optical layer 324, and the dielectric layer 328 have generally the same characteristics and features as the respective layers 120, 124, and 128 in the MEMS device 100 described with reference to FIGS. 8A and 8B. The mechanical layer 332 comprises one or more support posts 336*a* and 336*b* and has generally the same characteristics as the mechanical layer 132 except as specifically stated otherwise.

In the embodiment shown in FIGS. 10A and 10B, the reflective element 107 comprises a mirror 375 disposed between the mechanical layer 332 and the dielectric layer 328. In certain embodiments, the mirror 375 is generally parallel to and spaced from the mechanical layer 332. The reflective element 107 comprises a support connection 377 that mechanically couples the mirror 375 to the mechanical layer 332. In the embodiment shown in FIGS. 10A and 10B, the mirror 375 and the support connection 377 comprise an electrically conductive material such as, for example, aluminum, nickel, indium-tin-oxide, or molybdenum. In contrast to the MEMS device 200 (FIGS. 9A and 9B), the conductive support post 377 electrically couples the mirror 375 to the mechanical layer 332. Thus, in this embodiment, the mirror 375 is both mechanically and electrically coupled to the mechanical layer 332.

In this embodiment of the MEMS device, the mirror 375 is electrically conductive and highly reflective and which may be fabricated from a highly conductive and reflective metal such as, for example, aluminum. In this embodiment, a lower surface of the mechanical layer 332 is not configured to be reflective. In the embodiment of FIGS. 10A and 10B, the optical layer 324 comprises the first electrode 101. The support structure 105 comprises the mechanical layer 332 and the support posts 336*a* and 336*b*. The mechanical layer 332 and the mirror 375 comprise the second electrode 102. As shown in FIGS. 10A and 10B, each of the support posts 336*a*, 336*b* includes an electrically conductive portion. The third electrode 103 of the device 300 comprises these electrically conductive portions. In this embodiment, and in distinction to the device 100 shown in FIGS. 8A and 8B, the conductive portions of the support posts 336*a*, 336*b* are positioned substantially symmetrically with respect to the mirror 375 to provide a third electrode 103 which is positioned substantially symmetrically with respect to the reflective element 107.

As described above with reference to FIGS. 8A to 9B, a voltage difference applied between the mechanical layer 332 and the optical layer 224 can cause the mechanical layer 232 to deform from the relaxed state (FIG. 10A) to the driven state (FIG. 10B). The reflective element 107 moves from the second position when it is in the relaxed state (FIG. 10A) to the first position when it is in the driven state (FIG. 10B). In the driven state, the reflective element 107 is in contact with the portion 113 of the device 200, and an adhesive force is generated therebetween.

By applying voltages to the electrodes 101, 102, and 103, the MEMS device 300 can at least partially reduce or counteract the adhesive force between the reflective element 107 and the portion 113 of the device 300. The voltages may be applied to the device 300 in substantially the same manner as described for the MEMS devices 100 and 200 so as to achieve a reduction in the adhesive force.

FIG. 10B shows an embodiment of the MEMS device 300 in which the conductive portions of the support posts 336*a*, 336*b* are maintained at the same electric potential as one another. In this embodiment, a pair of electrostatic forces 356*a* and 356*b* is generated between the mirror 375 and the electrically conductive portions of the support posts 336*a* and 336*b*, respectively. The magnitude of the electrostatic force 356*a* is substantially equal to the magnitude of the electrostatic force 356*b* due to the substantially symmetrical placement of the electrically conductive portions 336*a*, 336*b* and due to their being maintained at the same electric potential. Each of the electrostatic forces 356*a*, 356*b* can be decomposed into parallel force components 360*a*, 360*b*, respectively, and perpendicular force components 364*a*, 364*b*, respectively. The electrostatic forces 356*a*, 356*b* (or their components 360*a*, 360*b* and 364*a*, 364*b*) can be added together vectorally to produce a net force acting on the mirror 375. Because the electrically conductive portions of the support posts 336*a*, 336*b* in the device 300 are maintained at the same potential and are positioned substantially symmetrically relative to the mirror 375, the parallel force components 360*a* and 360*b* are substantially equal in magnitude but opposite in direction. Therefore, the net parallel force component acting on the mirror 375 is substantially zero. In this embodiment, the perpendicular force components 364*a*, 364*b* are also substantially equal in magnitude, however, they are in the same direction. Therefore, the net electrostatic force acting on the reflective element 107 is substantially perpendicular to the plane that includes the portion 113 of the device 300.

In some embodiments of the MEMS device 300, voltages are applied to the electrodes 101, 102, and 103 so that the net electrostatic force on the reflective element 107 causes at least a partial reduction of the adhesive force between the reflective element 107 and the portion 113 of the device 300. As described herein with reference to FIGS. 8A to 9B, the applied voltages may induce elastic deformations or elastic oscillations in the reflective element 107 that at least partially reduce the adhesive force. In certain embodiments of the MEMS device 300, one or more of the voltages are time-varying and may include a voltage comprising one or more frequencies. The frequency of the time-varying voltage may be selected to be a mechanical resonant frequency of the device 300 or to increase an amplitude of an elastic oscillation induced in the device 300. In other embodiments, one or more short duration voltage impulses may be applied to at least one of the electrodes 101, 102, and 103. For example, in one embodiment, one or more voltage impulses is applied to the third electrode while the reflective element 107 is in the first position (FIG. 10B) so as to induce oscillations or accelerations that facilitate the release of the reflective element 107 from the portion 113 of the device 300. In another embodiment, the voltages are applied so as to induce a vibration of the reflective element 107 in the generally perpendicular direction indicated by arrow 380. In yet other embodiments, the voltages applied to the electrodes 101, 102, and 103 may be selected to induce a combination of the aforementioned oscillations or accelerations. For example, in one embodiment, an oscillatory voltage is applied to one of the electrodes while one or more voltage impulses are applied to any or all of the three electrodes. The voltages applied to the electrodes 101, 102, and 103 may be different from the examples described herein and many other variations and combinations of are possible in different embodiments of the MEMS device 300.

In other embodiments of the MEMS device 300, the electrically conductive portion of the support post 336*a* may be maintained at a different electric potential than the electrically conductive portion of the support post 336*b*. In these embodiments, the electrostatic forces 356*a* and 356*b* will not be of substantially equal magnitude. Accordingly, the net electrostatic force on the reflective element 107 will include a net parallel force component. By appropriately selecting the values of the electric potentials applied to each of the conductive portions of the support posts 336*a*, 336*b*, a net parallel force component can be generated in at least one of the directions indicated by double-headed arrow 384. Accordingly, the reflective element 107 may be induced to oscillate or vibrate along the two directions of the arrow 384. The applied voltages may have a time varying component with a frequency selected to induce an elastic deformation or an elastic oscillation of the reflective element 107. In some embodiments, the frequency may be selected to substantially match a mechanical resonant frequency of the reflective element 107 or to cause an increased amplitude oscillation. In certain embodiments, voltages between the electrically conductive portions of the support posts 336*a* and 336*b* and the reflective element 107 are cycled so as to induce a periodic displacement of the reflective element 107 in the two directions of the double-headed arrow 384. The periodic displacement may at least partially reduce the adhesive force and assist the release of the reflective element 107 from the portion 113 of the device 300.

Although FIGS. 10A and 10B illustrate the third electrode 103 comprising electrically conductive portions of the two support posts 336*a* and 336*b*, it is contemplated that in other embodiments the third electrode 103 can comprise electrically conductive portions of additional support posts (and/or other suitable structural elements). In certain embodiments the third electrode 103 comprises electrically conductive portions of four support posts disposed substantially symmetrically around the mirror 375, e.g., the two support posts 336*a* and 336*b* and two substantially similar support posts disposed in a plane that is perpendicular to the plane of the cross-section shown in FIGS. 10A and 10B. Voltages applied to electrically conductive portions of each of the support posts can be used to induce displacements, oscillations, and/or vibrations not only in the direction of the arrows 380 and 384 (as described above) but also in a mutually perpendicular direction (e.g., into or out of the plane of FIGS. 10A and 10B). A person of skill in the art will recognize that by applying suitable voltages as described herein (including time-varying and impulsive voltages), the adhesive force can be at least partially reduced or counteracted while the reflective element 107 is in the driven state (e.g., FIG. 10B) so as to assist movement to the relaxed state (e.g., FIG. 10A). Many variations in the configuration of, and the voltages applied to, the third electrode 103 are possible, and the example embodiments discussed herein are not intended as a limitation on the scope of the claimed invention.

In yet other embodiments of the MEMS device 300, the electrically conductive portions of the support posts 336*a*, 336*b* are not positioned substantially symmetrically relative to the reflective element. In these embodiments, the electrostatic forces 356*a*, 356*b* will not in general be substantially equal in magnitude even if the conductive portions are maintained at the same electric potential. In some embodiments, an asymmetric positioning is provided by fabricating the device 300 such that one or more of the conductive portions is not substantially centered within the support posts 336*a*, 336*b*.

In certain preferred embodiments, the voltages applied to the MEMS device 300 may be selected to induce displacements, deformations, oscillations, or vibrations of the reflective element 107 in both the parallel and the perpendicular directions as indicated by the arrows 384 and 380, respectively. In some of these embodiments, the time-varying voltages may include voltages with more than one frequency in order to induce resonant or increased amplitude oscillations in both the parallel and perpendicular directions. In other embodiments, a short duration voltage impulse is applied to induce a displacement or acceleration in one direction, while an oscillatory voltage is applied to induce an oscillation or vibration in the other direction. In yet other embodiments, the applied voltages are cycled to produce a combination of these effects. Many other variations are possible.

Figure 11A:
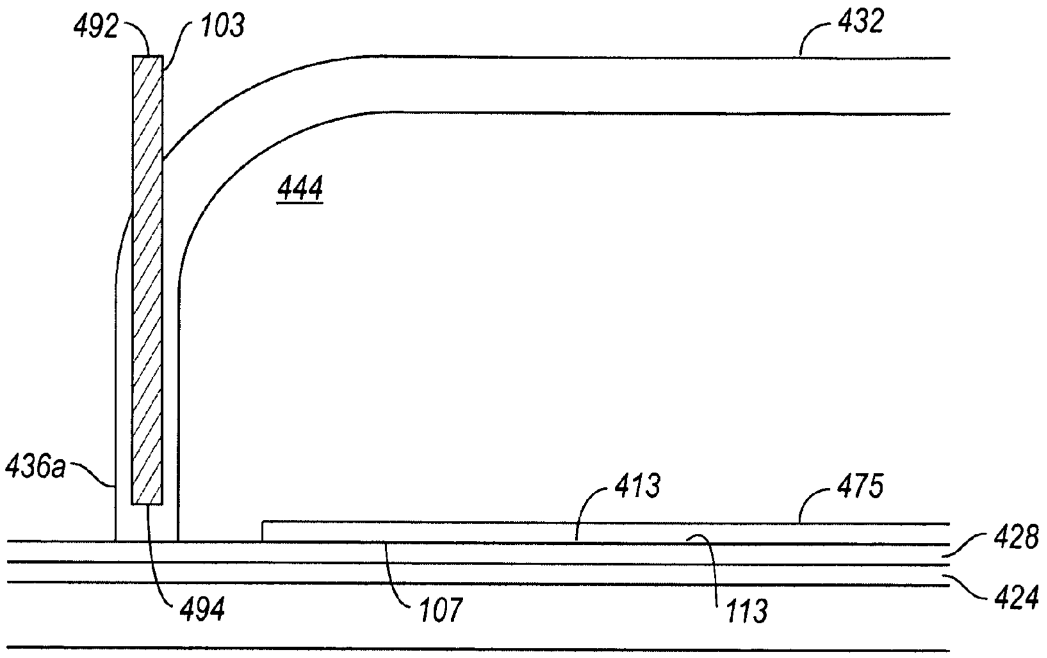
FIG. 11A is a side cross-sectional view of a portion of an embodiment of a MEMS device in the actuated or driven state before a voltage is applied to a third electrode.
Figure 11B:
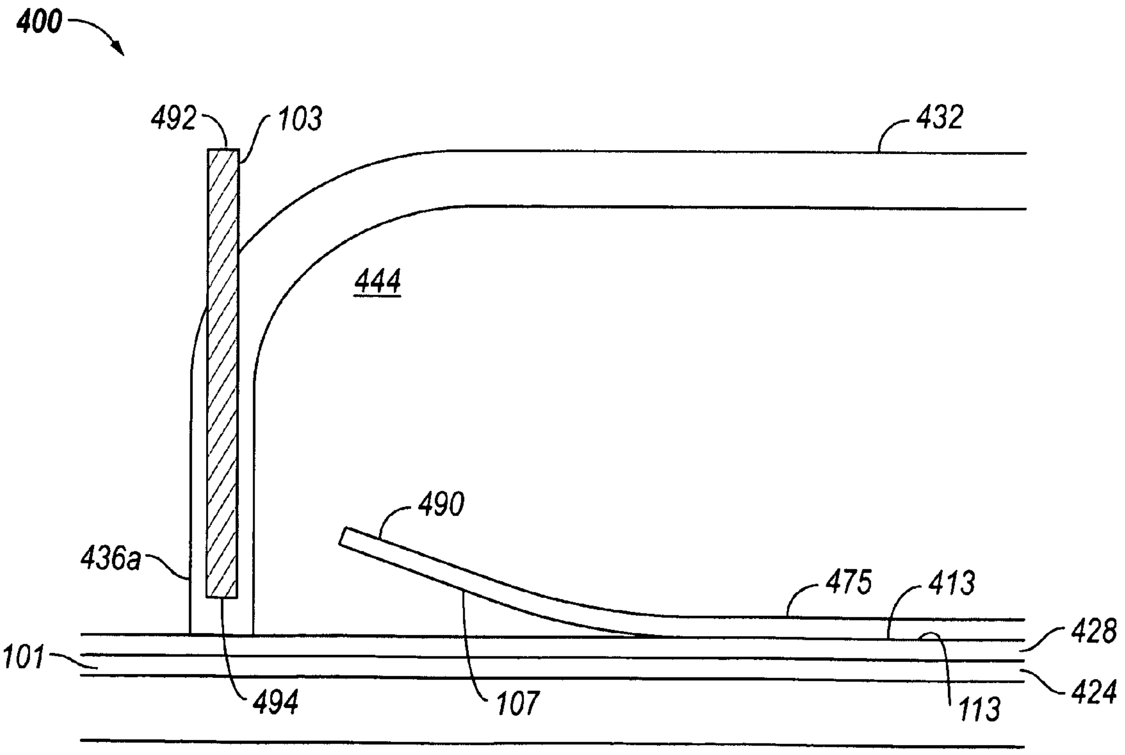
FIG. 11B is a close-up, side cross-sectional view of the portion of the MEMS device shown in FIG. 11A after the voltage is applied to the third electrode.

FIGS. 11A and 11B are side cross-sectional views of a portion of one embodiment of a MEMS device 400 having an elastically deformable reflective element 107 in the driven state. The reflective element 107 is in the first position in which it is in contact with the portion 113 of the device 400. In FIG. 11A, an electric potential difference has not been applied between the third electrode 103 and the reflective element 107. The mirror 475 of the reflective element 107 is oriented in a substantially flat configuration that is substantially parallel to the portion 113 of the device 400. As shown in FIG. 11A, the portion 113 of the device that is in contact with the reflective element 107 defines a contact area 413.

FIG. 11B shows a configuration of the MEMS device 400 of FIG. 11A after an electrical potential difference has been established between the third electrode 103 and the reflective element 107. The electrostatic force between the third electrode 103 and the reflective element 107 causes an end portion 490 of the reflective element 107 to deform elastically in a direction that is generally perpendicular to the portion 113. The end portion 490 of the reflective element 107 is no longer in contact with the portion 113 of the device. The contact area 413 between the reflective element 107 and the portion 113 is reduced; therefore, the adhesive force between the reflective element 107 and the portion 113 is reduced. The reduction in the adhesive force facilitates the release of the reflective element 107 from the portion 113 and facilitates the operation of the device 400. After the reflective element 107 has released from the portion 113 of the device in which it was in contact, the potential difference between the third electrode 103 and the reflective element 107 is reduced to zero in certain embodiments of the device 400. After release from the portion 113, the end portion 490 of the reflective element 107 generally returns to an orientation that is substantially parallel to the plane that contains the optical layer 424 in order that the cavity 444 provides suitable optical interference for light incident on the device 400.

In other embodiments of MEMS device, in addition to or instead of the deformation shown in FIG. 11B, the voltages applied to the electrodes 101, 102, and 103 may cause elastic oscillations, vibrations, resonances, or other types of displacement of the reflective element 107 while it is in the first position as described herein. These motions may generally be in the parallel direction, the perpendicular direction, or a combination of both. The motions induced by the voltages can at least partially reduce the adhesive force between the reflective element 107 and the portion 113, for example, by reducing the contact area between the reflective element 107 and the portion 113, or by reducing the magnitude of intermolecular forces responsible in part for the adhesion, or for some other physical reason.

In certain embodiments, the third electrode 103 may be positioned substantially symmetrically with respect to the reflective element 107 (for example, as shown in FIGS. 10A and 10B), while in other embodiments, the third electrode 103 may be positioned asymmetrically with respect to the reflective element 107 (for example, as shown in FIGS. 8A and 8B). Symmetrical positions may be selected for embodiments of MEMS devices in which it is advantageous to reduce displacements of the reflective element 107 in the direction generally parallel to the portion 113. Alternatively, asymmetrical positions may be selected for embodiments in which it is advantageous to provide a parallel displacement or vibration. The symmetrical or asymmetrical positioning of the third electrode 103 can be achieved in a different ways in various MEMS architectures. For example, in embodiments in which the third electrode 103 comprises electrically conductive portions of one or more support posts (e.g., the posts 336*a*, 336*b* in FIGS. 10A-10B), the positions of the support posts can be selected to be symmetrical or asymmetrical with respect to the reflective element 107. In other embodiments, the support posts can be positioned symmetrically, but the locations of the electrically conductive portions within the posts can be asymmetric, for example, by disposing one or more conductive portions away from a central axis of the support post.

In the embodiment schematically illustrated by FIGS. 11A-11B, the electrically conductive portion of the support post 436*a* is disposed substantially along a central axis of the post 436*a*. The conductive portion may be disposed away from the central axis in other embodiments. As shown in FIGS. 11A-11B, the conductive portion extends substantially the entire length of the post 436*a*. In some embodiments, a top end 492 of the support post 436*a* extends beyond the mechanical layer 432. In the device 400 shown in FIGS. 11A and 11B, a lower end 494 of the conductive portion of the third electrode 103 extends toward the dielectric layer 428. A position of the lower end 494 may be different in other embodiments. The position of the lower end 494 may be selected to provide different magnitudes and/or directions of the electrostatic force exerted on the reflective element 107 so as to provide for different amounts of deformation of the reflective element 107.

The third electrode 103 may be configured differently than shown in FIGS. 8A-11B. For example, in different MEMS architectures, the third electrode 103 may comprise one, two, three, four, or more electrically conductive portions of the MEMS device including, for example, portions of the support posts, the mechanical layer, the mirror, or other portions of the device. In some embodiments, the electrostatic force used to facilitate the release of the reflective element 107 from the portion 113 may be provided by electrodes 101, 102, and 103 as well as by other electrodes. In one embodiment, for example, the third electrode 103 comprises a plurality of electrodes, each disposed near each side of the reflective element 107. By suitably applying voltages to these electrodes, the reflective element 107 can be induced to oscillate or vibrate in multiple directions: a first direction that is perpendicular to the portion 113 (indicated by the arrow 380 in FIG. 10B) as well as second and third directions that are substantially parallel to the portion 113 (e.g., a second direction indicated by the arrow 384 in FIG. 10B and a third mutually perpendicular direction that is into or out of the plane of FIG. 10B).

Figure 12A:
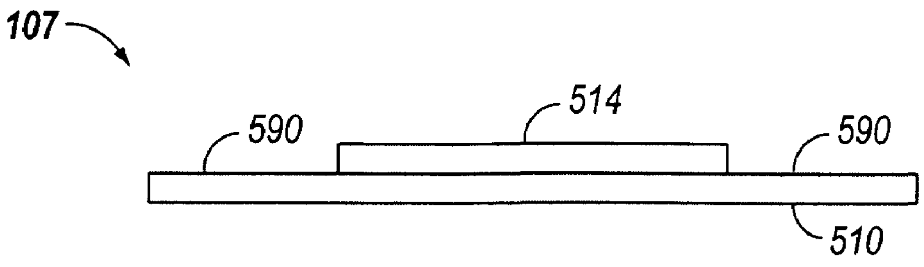
FIGS. 12A-12D are side cross-sectional views of different embodiments of a reflective element in a MEMS device.

FIGS. 12A-12D are side cross-sectional views of various configurations of the reflective element 107 in accordance with various embodiments described herein. In certain embodiments, the reflective element 107 comprises more than one layer. The reflective element 107 shown in FIG. 12A comprises a second layer 514 disposed over a first layer 510. The layers may comprise different materials and may have different mechanical and electrical properties. In some embodiments, the first layer 510 is configured to be a highly reflective portion of an interferometric cavity, and the second layer 514 is configured to provide structural rigidity to the reflective element 107. In these embodiments, the first layer 510 comprises a highly reflective metal such as aluminum, and the second layer 514 comprises a dielectric material and/or a rigid material, such as an aluminum alloy or nickel that may be deposited on at least a portion of the first layer 510. In certain embodiments, at least a portion of one or more of the layers may be electrically conductive. In certain such embodiments, one or more of the electrodes 101, 102, and 103 may comprise at least a portion of the electrically conductive portions of the layers. In some embodiments, the first layer 510 may be configured to have a different thickness than the second layer 514. For example, as schematically shown in FIG. 12A, the first layer 510 is thinner than the second layer 514. At least a portion of the first layer 510 may be configured to be elastically flexible. For example, end portions 590 of the first layer 510 of the reflective element 107 in FIG. 12A may be configured to have increased elastic flexibility as compared to the second layer 514. The flexibility of the first layer 510 is advantageous in embodiments such as, for example, the MEMS device 400 shown in FIGS. 11A and 11B, wherein the electrostatic force causes an elastic deformation of the end portions 590 of the reflective layer 107. In the embodiment shown in FIG. 12A, the thickness of the end portions 590 of the first layer 510 is approximately equal to the thickness of the second layer 514. In other embodiments, different layer thicknesses may be used. In certain embodiments, the first layer 510 is thinner than the second layer 514. In other embodiments, at least the end portions 590 of the first layer 510 are thinner than the second layer 514. For example, in certain such embodiments the thickness of the end portions 590 is in a range from about ⅓ to about ½ the thickness of the central portions of the reflective element 107.

Figure 12B:
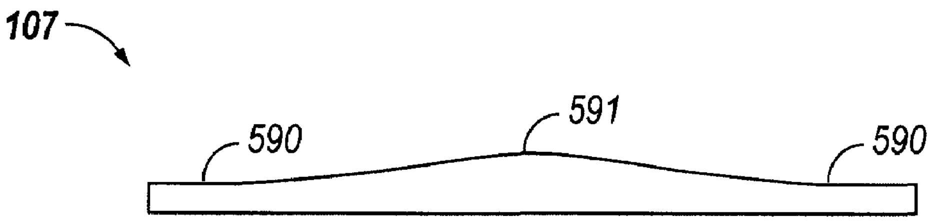

In some embodiments, the thickness of the reflective element 107 is nonuniform. FIG. 12B is a side cross-sectional view of a reflective element 107 in which the end portions 590 are configured to be thinner than a central portion 591. As described above, the thinner end portions 590 may facilitate the elastic deformation of the reflective element 107. In some embodiments, the tapering of the reflective element 107 from the center portion 591 to the end portions 590 may be selected to provide a suitable mechanical resonant frequency that can be excited by the voltages applied to the electrodes 101, 102, and 103. In certain embodiments, the thickness of the end portions 590 is in a range from about ⅓ to about ½ the thickness of the central portions of the reflective element 107; however, other thicknesses and other taperings can be used.

Figure 12C:
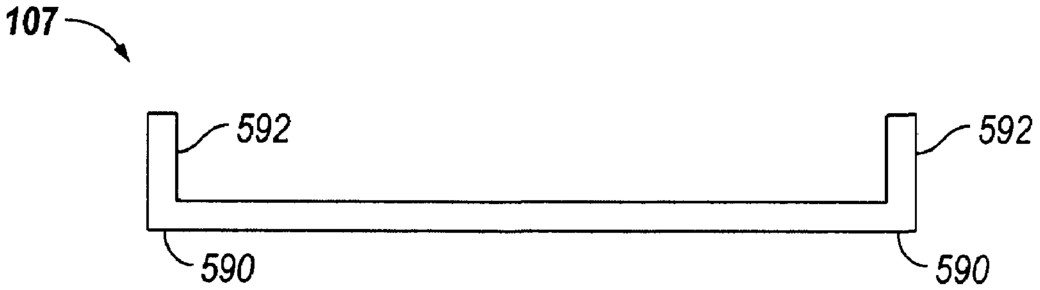

FIG. 12C is a side cross-sectional view of a reflective element 107 in which one or more extensions 592 are disposed on the reflective element 107. As shown in FIG. 12C, the extensions 592 are disposed on or near the end portions 590 of the reflective element 107, but in other embodiments, the extensions 592 may be disposed at other locations. In some embodiments, the extensions 592 are electrically conductive and may provide an increased electrostatic attraction to other portions of the MEMS device when a voltage difference is applied between the extensions 592 and the other portions (e.g., first or second electrodes 101, 102) of the MEMS device. In some embodiments, the height of the extensions 592 above an upper surface of the reflective element 107 is in a range from about ⅓ to about ½ of the thickness of the central portions of the reflective element 107, although other heights may be used.

Figure 12D:
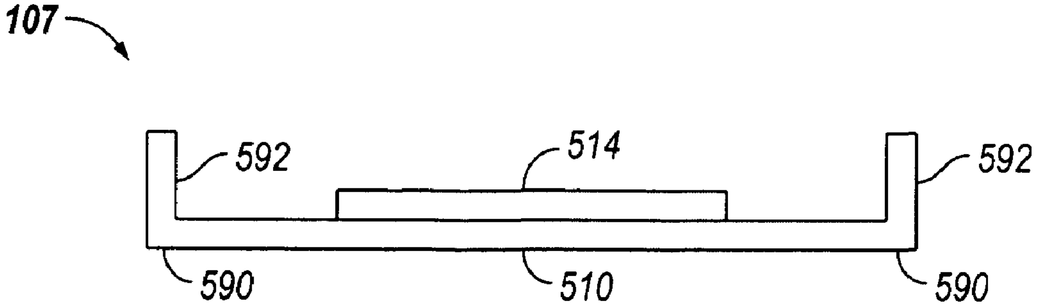

FIG. 12D is a side cross-sectional view of a reflective element 107 that comprises two layers 510 and 514 and the extensions 592. In this embodiment, the extensions 592 are disposed on the first layer 510, but they may be disposed on the second layer 514 in other embodiments. The thicknesses of the layers 510 and 514 and the heights of the extensions 592 can be selected to provide suitable electrical and/or structural properties that assist in at least partially reducing the adhesive force.

The configurations and orientations shown in FIGS. 12A-12D are not intended to be limitations. Other embodiments of the reflective element 107 may combine one or more of the features shown in FIGS. 12A-12D or may be configured differently. Many variations are possible.

Figure 13A:
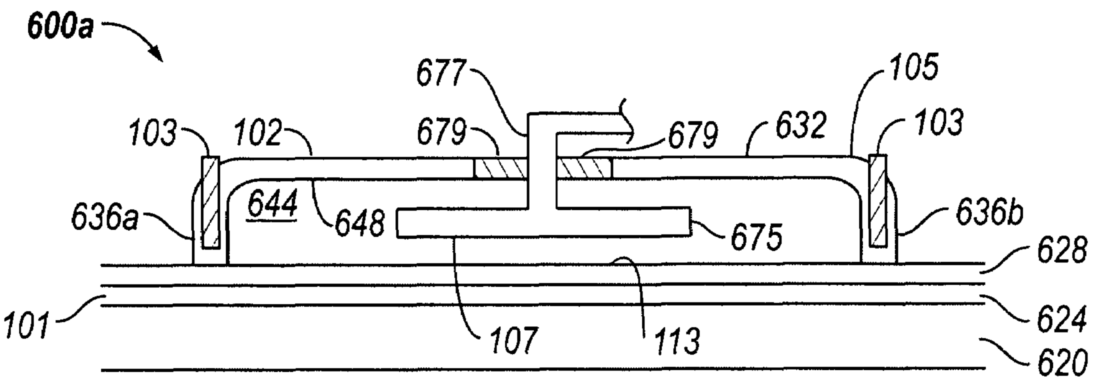
FIGS. 13A-13D are side cross-sectional views of additional embodiments of MEMS devices in the relaxed state.
Figure 13B:
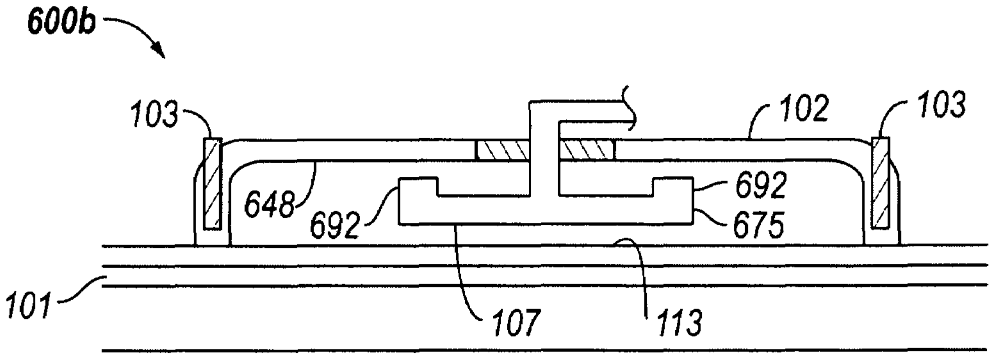
Figure 13C:
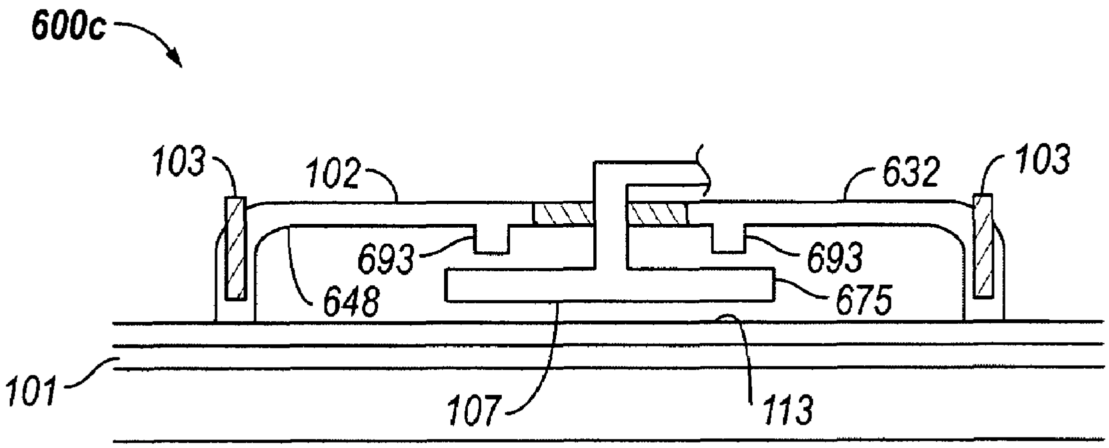

The details of the structure of interferometric modulators that operate in accordance with the principles set forth herein may vary widely. For example, FIGS. 13A-13C illustrate three different embodiments of a MEMS device in the relaxed state. FIG. 13A shows a MEMS device 600*a* that is fabricated on a substrate layer 620 and that comprises an optical layer 624, a dielectric layer 628, and a mechanical layer 632. The substrate layer 620, the optical layer 624, and the dielectric layer 628 have generally the same characteristics and features as the respective layers 120, 124, and 128 in the MEMS device 100 described with reference to FIGS. 8A and 8B. The mechanical layer 632 comprises one or more support posts 636*a* and 636*b* and has generally the same characteristics as the mechanical layer 132 (FIGS. 8A and 8B) except as specifically stated otherwise.

In the embodiment shown in FIG. 13A, the reflective element 107 comprises a mirror 675 which is generally parallel to and spaced from the mechanical layer 632 and the dielectric layer 628. The reflective element 107 comprises a support connection 677 that mechanically couples the mirror 675 to the mechanical layer 632. In the embodiment shown in FIG. 13A, the mirror 675 and the support connection 677 comprise an electrically conductive material such as, for example, aluminum, nickel, indium-tin-oxide, or molybdenum. A portion 679 of the mechanical layer 632 comprises an electrically nonconductive material and is configured to provide electrical insulation between the mirror 675 and the mechanical layer 632. In this embodiment, the mirror 675 is mechanically coupled to, but electrically insulated from, the mechanical layer 632.

In this embodiment of the MEMS device, the mirror 675 of the reflective element 107 is electrically conductive and highly reflective and may be fabricated from a highly conductive and reflective metal such as, for example, aluminum. In this embodiment, a lower surface 648 of the mechanical layer 632 is not configured to be reflective. The optical layer 624 comprises the first electrode 101. The support structure 105 comprises the mechanical layer 632 and the support posts 636*a* and 636*b*. The mechanical layer 632 comprises the second electrode 102. As shown in FIG. 13A, the third electrode 103 of the device 600 comprises electrically conductive portions of the support posts 636*a*, 636*b*.

In certain embodiments of the MEMS devices shown in FIGS. 13A-13D, the mirror 675 is electrically conductive and is connected to an electric voltage or current source that is independent of the three electrodes 101, 102, and 103. In these embodiments, different voltages are applied to the optical layer 624, the mechanical layer 632, and the mirror 675 to provide a tunable interferometric cavity 644 in which the movement of the mirror surface (e.g., the reflective element 107) has a tunable relationship to these applied voltages. Further details regarding tunable MEMS architectures are provided in U.S. patent application Ser. No. 11/144,546 titled "ANALOG INTERFEROMETRIC MODULATOR DEVICE," filed Jun. 3, 2005, which is hereby incorporated by reference herein in its entirety.

By applying voltages to the electrodes 101, 102, and 103, the MEMS device 600*a* can at least partially reduce or counteract the adhesive force between the reflective element 107 and the portion 113 of the device when in the first position. The voltages may be applied to the device 600*a* in substantially the same manner as described herein for the MEMS devices 100, 200, 300, and 400 so as to achieve at least a partial reduction in the adhesive force and to facilitate the release of the reflective element 107 from the portion 113.

FIG. 13B is a side cross-sectional view of another embodiment of a MEMS device 600*b* that is generally similar to the device 600*a* shown in FIG. 13A except as described below. In this embodiment, the reflective element 107 comprises one or more extensions 692 extending toward the second electrode 102. The extensions 692 may be disposed on an upper surface of the mirror 675. In some embodiments, the shape of the mirror 675 is generally similar to the shapes illustrated in FIGS. 12C and 12D. The extensions 692 protrude toward the second electrode 102 (e.g., the mechanical layer 632). Because the extensions 692 are closer to the second electrode 102, the electrostatic force exerted by the second electrode 102 on the extensions 692 is larger than on other portions of the mirror 675 and may facilitate the release of the reflective element 107 when in the first position.

FIG. 13C is a side cross-sectional view of another embodiment of a MEMS device 600*c* that is generally similar to the devices 600*a* and 600*b* shown in FIGS. 13A and 13B except as described below. In this embodiment, the second electrode 102 may be configured to have one or more extensions 693 extending toward the reflective element 107. In certain embodiments, the extensions 693 are disposed on the surface 648 of the mechanical layer 632. Because the extensions 693 of the second electrode 102 are closer to the reflective element 107, the electrostatic force exerted by the second electrode 102 on the reflective element 107 is larger and may facilitate the release of the reflective element 107 when in the first position. In some embodiments, both the second electrode 102 and the reflective element 107 are configured to comprise the extensions 693 and 692, respectively.

In some embodiments of the devices 600*b* and 600*c* shown in FIGS. 13B and 13C, the extensions 692 and/or 693 are coated with a dielectric material so as to electrically insulate them from contact with other portions of the devices 600*b*, 600*c* such as, for example, the surface 648 of the mechanical layer 632.

Figure 13D:
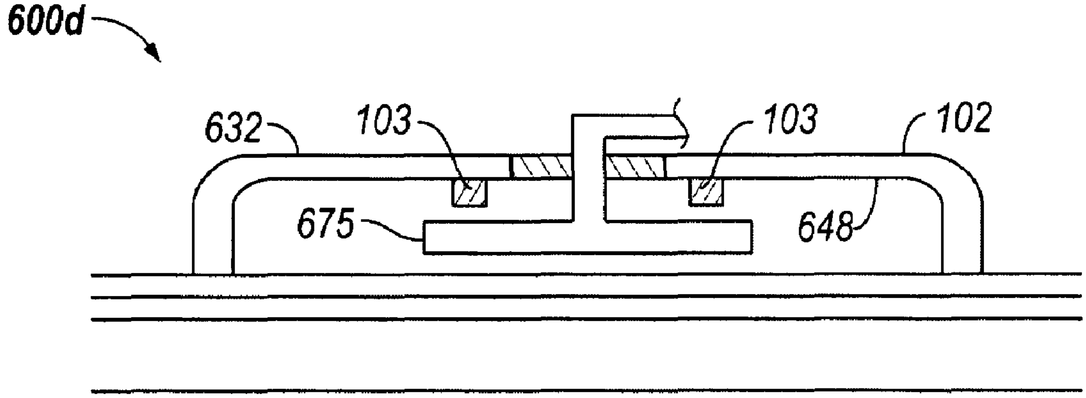

FIG. 13D is a side cross-sectional view of another embodiment of a MEMS device 600*d* that is generally similar to the devices 600*a*, 600*b*, and 600*c* shown in FIGS. 13A-13C except as described below. In the device 600*d*, the third electrode 103 comprises extensions that are disposed on the surface 648 of the mechanical layer 632. The third electrode 103 is electrically insulated from the second electrode 102 (e.g., the mechanical layer 632), for example, by providing a thin layer of nonconductive material between the third electrode 103 and the second electrode 102. In these embodiments, the third electrode 103 protrudes more closely to the reflective element 107, which may increase the electrostatic force exerted by the third electrode 103 on the reflective element 107 and may facilitate the release of the reflective element 107 from the portion 113 when the reflective element 107 is in the first position.

Figure 14:
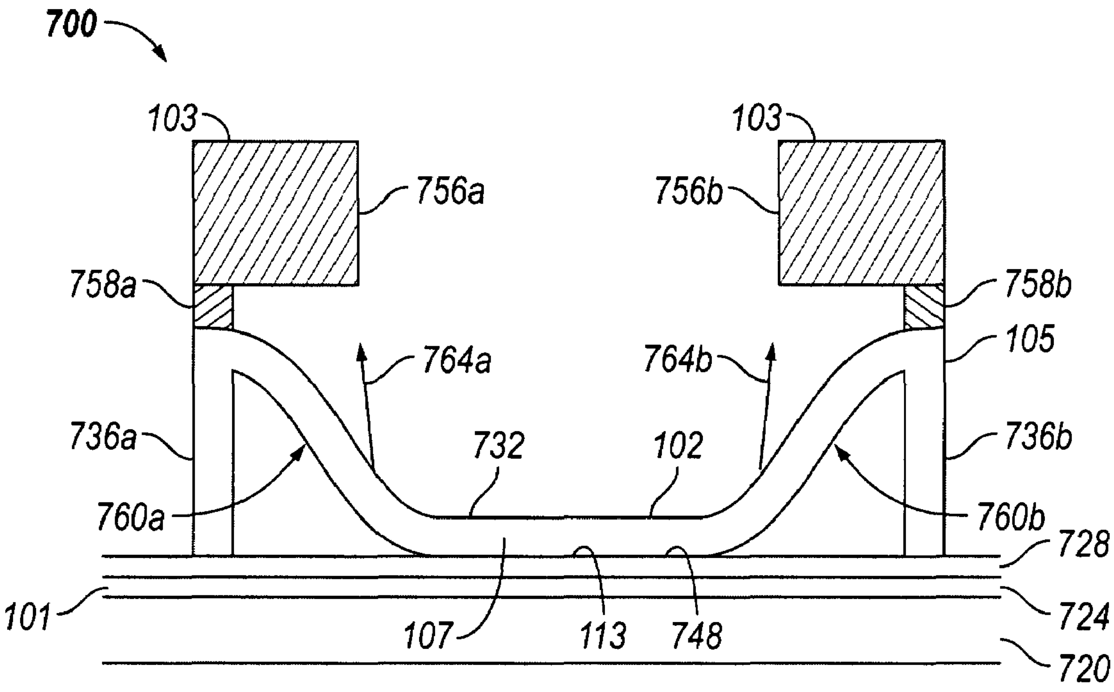
FIG. 14 is a side cross-sectional view of an embodiment of a MEMS device in the actuated or driven state.

FIG. 14 illustrates a side cross-sectional view of another embodiment of a MEMS device 700 shown in the driven or actuated state. The MEMS device 700 is fabricated on a substrate layer 720 and comprises an optical layer 724, a dielectric layer 728, and a mechanical layer 732. The substrate layer 720, the optical layer 724, and the dielectric layer 728 have generally the same characteristics and features as the respective layers 120, 124, and 128 in the MEMS device 100 described with reference to FIGS. 8A and 8B. The mechanical layer 732 comprises one or more support posts 736*a* and 736*b* and has generally the same characteristics as the mechanical layer 132 except as specifically stated otherwise.

In the embodiment shown in FIG. 14, the reflective element 107 comprises a reflective portion of the mechanical layer 732, for example, by making a portion of a lower surface 748 of the mechanical layer 732 highly reflective. In this embodiment, the first electrode 101 comprises the optical layer 724. The support structure 105 comprises the mechanical layer 732 and the support posts 736*a* and 736*b*. In some embodiments, at least a portion of the mechanical layer 732 is electrically conductive and comprises the second electrode in the MEMS device 700. In certain embodiments, portions of the support posts 736*a* and 736*b* are electrically nonconductive and insulate portions of the mechanical layer 732 from other portions of the device 700 (e.g., the optical layer 724).

The MEMS device 700 shown in FIG. 14 comprises electrodes 756*a* and 756*b* that are disposed above the support posts 736*a* and 736*b* and that are electrically insulated from other portions of the device 700 by electrically nonconductive regions 758*a* and 758*b*. In some embodiments, the electrically nonconductive regions 758*a*, 758*b*comprise a dielectric material such as, for example, a dielectric film. In the embodiment shown in FIG. 14, the third electrode 103 comprises the electrodes 756*a* and 756*b*. The electrodes 756*a* and 756*b* in other embodiments can have shapes and sizes that are different than shown in FIG. 14. For example, the electrodes 756*a* and 756*b* may be relatively short in some embodiments. It is preferred, although not necessary, for at least a portion of each of the electrodes 756*a* and 756*b* to be disposed above at least a portion of the reflective element 107.

FIG. 14 schematically illustrates the MEMS device 700 when the reflective element 107 is in a first position (the actuated or driven state) in which the reflective element 107 is in contact with a portion 113 of the device 700. As further described above, the reflective element 107 can move to a second position (the unactuated or relaxed state) in which it is not in contact with the portion 113. For example, the mechanical layer 732 may be fabricated from a mechanically deformable material such as a metal (e.g., aluminum) that can move between the first and second positions. When the device 700 is in the driven state, the mechanical layer 732 is deformed and comprises bending regions 760*a* and 760*b*, which are disposed between the portion 113 and the support posts 736*a* and 736*b*, respectively. In certain embodiments, the reflective element 107 (when in the driven state) is also deformed and also comprises the bending regions 760*a* and 760*b*.

In some embodiments of the device 700, at least portions of the electrodes 756*a* and 756*b* are disposed higher than the reflective element 107 when the reflective element 107 is in the first position. In certain embodiments, at least a portion of each of the electrodes 756*a* and 756*b* protrudes away from the support posts 736*a* and 736*b*, respectively, such that these portions are disposed above (e.g., higher than) at least a portion of the reflective element 107 when the reflective element 107 is in the first position (FIG. 14). In certain preferred embodiments, the electrodes 756*a* and 756*b* are configured so that at least a portion of the electrodes 756*a* and 756*b* is disposed directly above at least a portion of the bending regions 760*a* and 760*b*, respectively.

In some embodiments of the MEMS device 700, voltages are applied to the electrodes 101, 102, and 103 so that a net electrostatic force on the reflective element 107 at least partially reduces or counteracts the adhesive force on the reflective element 107 in the first position. As discussed further above, the voltages may have various ranges of magnitudes and frequencies and may be applied to induce displacements, oscillations, and/or vibrations of the reflective element 107 to assist in moving the reflective element 107 from the first position to the second position. In certain embodiments, a voltage difference is applied between the third electrode 103 (e.g., the electrodes 756*a*, 756*b*) and the second electrode 102 (e.g., an electrically conductive portion of the mechanical layer 732). The voltage difference can have various ranges of magnitudes and frequencies and can comprise one or more relatively short duration impulses. In various embodiments, the third electrode 103 is electrically connected to one or more voltage sources by traces or wires that lead off of the display array 30 to the array driver 22 (see FIG. 2). In one embodiment of the device 700, the array driver 22 may use a driver circuit generally similar to the row and column driver circuits 24 and 26 to communicate a suitable electrical signal to the third electrode 103.

The voltage difference applied between the second and third electrodes 102 and 103 causes net electrostatic forces indicated by arrows 764*a* and 764*b* to act on the reflective element 107. In certain preferred embodiments, portions of the electrodes 756*a* and 756*b* protrude directly above at least portions of the bending regions 760*a* and 760*b* so that the net electrostatic forces 764*a* and 764*b* have reasonably large perpendicular components in the bending regions 760*a* and 760*b* that tend to pull the reflective element 107 away from the portion 113. In certain such embodiments, the electrostatic forces 764*a* and 764*b* may at least partially reduce or counteract the adhesive force and may assist in moving the reflective element 107 from the first position to the second position. Without subscribing to any particular theory, the net electrostatic force 764*a* applied in the bending region 760*a* may induce crack opening at an edge of a contact interface between the reflective element 107 and the portion 113. The crack may propagate across the contact interface, assisting the reflective element 107 to peel away from the portion 113 and to move from the first position to the second position. The net electrostatic force 764*b* applied in the bending region 760*b* may act in a similar manner, and in certain embodiments cracks may open at opposing edges of the contact interface and propagate across the interface. Although it is preferred that at least two electrodes 756*a* and 756*b* be used to reduce or counteract the adhesive force on the reflective element 107, in other embodiments different configurations, orientations, and numbers of electrodes (e.g., one) can be used, for example, to initiate crack opening and facilitate release of the reflective element 107.

Embodiments of the MEMS device 700 can provide certain advantages. For example, the magnitudes of the electrostatic forces 764*a*, 764*b* at the bending regions 760*a*, 760*b* needed to facilitate release from the driven to the undriven state typically are much smaller than if the forces were applied to a central region of the reflective element 107. Accordingly, smaller voltage differences (e.g., between the second and third electrodes 102 and 103) can be applied to the device 700. Moreover, in some embodiments, the electrodes 756*a* and 756*b* reduce electrostatic instability and collapse of the mechanical layer 732 onto the dielectric layer 728, which can be a problem in some closing-gap devices. Further, in certain embodiments, voltage impulses having a duration that is shorter than a typical release time of the device 700 can be used to facilitate movement of the reflective element 107 from the driven state to the undriven state.

The MEMS devices disclosed herein may be fabricated using suitable micromachining processes such as, for example, selective deposition and etching as described in the heretofore incorporated U.S. patent application Ser. No. 11/144,546. For example, certain embodiments of a MEMS device, such as the device 100 shown in FIG. 8A, may be fabricated by depositing a partially reflective and electrically conductive layer on a transparent or translucent substrate 120 to provide the optical layer 124. A dielectric layer 128 is deposited over the optical layer 124. Then, a sacrificial layer (not shown in FIG. 8A) is deposited over the dielectric layer 128. The sacrificial layer is selectively etched to form a plurality of holes exposing the dielectric layer 128. The holes are filled with a dielectric material such as, for example, aluminum oxide, to form support posts 136*a* and 136*b*. Other suitable dielectric materials include polymers and other organic or inorganic compounds.

A conductive and reflective material such as, for example, aluminum, is deposited over the support posts 136*a*, 136*b* and the sacrificial layer to form a mechanical layer 132. To form an electrically conductive portion of a third electrode 103, the mechanical layer 132 is selectively etched in certain embodiments to form an opening over the support post 136*a*. A portion of the support post 136*a* is selectively etched to form a hole, which may extend to the dielectric layer 128 in some embodiments. The hole is filled with a conductive material such as, for example, aluminum, nickel, indium-tin-oxide, or molybdenum, to form the electrically conductive portion of the third electrode 103.

Thereafter, an etchant is applied to the sacrificial layer, which reacts with and removes the sacrificial layer. As a result, the space filled with the sacrificial material becomes the interferometric cavity 144 and the MEMS device 100 of FIG. 8A is formed. As is known in the MEMS device fabrication arts, additional or different processing steps and materials may be used to fabricate a MEMS device in accordance with the embodiments disclosed herein.

Although certain preferred embodiments and examples are discussed above, it is understood that the inventive subject matter extends beyond the specifically disclosed embodiments to other alternative embodiments and/or uses of the invention and obvious modifications and equivalents thereof. It is intended that the scope of the inventions disclosed herein should not be limited by the particular disclosed embodiments. Thus, for example, in any method or process disclosed herein, the acts or operations making up the method/process may be performed in any suitable sequence and are not necessarily limited to any particular disclosed sequence. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

It is to be understood that persons of skill in the appropriate arts may modify the invention herein described while still achieving the favorable results of this invention. Accordingly, the foregoing description is to be understood as being a broad, teaching disclosure directed to persons of skill in the appropriate arts and not as limiting upon the invention.

What is claimed is:

1. A microelectromechanical system (MEMS) device comprising:

a first electrode;

a second electrode electrically insulated from the first electrode;

a third electrode electrically insulated from the first electrode and the second electrode;

a support structure which separates the first electrode from the second electrode, the third electrode comprising a conductive portion of the support structure;

an optical stack comprising the first electrode, wherein the optical stack is partially transparent or translucent and at least partially reflective of light; and a movable reflective element, wherein the optical stack and the reflective element define an interferometric optical cavity between the optical stack and the reflective element, the reflective element movable relative to the optical stack to modulate optical interference of the light by the interferometric optical cavity;

wherein the reflective element is located between a first position and a second position, the reflective element movable between the first position and the second position upon application of a voltage difference between the first electrode and the second electrode, the reflective element in contact with a portion of the optical stack when in the first position and not in contact with the portion of the optical stack when in the second position;

wherein an adhesive force is generated between the reflective element and the portion when the reflective element is in the first position, and wherein voltages applied to the first electrode, the second electrode, and the third electrode at least partially reduce or counteract the adhesive force.

2. The MEMS device of claim 1, wherein at least a portion of the third electrode is higher than the reflective element when the reflective element is in the first position.

3. The MEMS device of claim 2, wherein at least a portion of the third electrode is directly above at least a portion of the reflective element when the reflective element is in the first position.

4. The MEMS device of claim 1, wherein the third electrode is supported by the support structure.

5. The MEMS device of claim 1, wherein the support structure comprises one or more posts and the third electrode comprises a conductive portion of at least one of the posts.

6. The MEMS device of claim 5, wherein the support structure comprises a plurality of posts, each post having a conductive portion, and the third electrode comprises the conductive portions.

7. The MEMS device of claim 6, wherein the plurality of posts are positioned substantially symmetrically relative to the reflective element.

8. The MEMS device of claim 1, wherein the reflective element comprises a first layer and a second layer over the first layer.

9. The MEMS device of claim 8, wherein the first layer is more flexible than the second layer.

10. The MEMS device of claim 8, wherein the first layer is thinner than the second layer.

11. The MEMS device of claim 8, wherein the second layer covers a central portion of the first layer and does not cover one or more edge portions of the first layer.

12. The MEMS device of claim 8, wherein at least one of the first layer and the second layer is conductive.

13. The MEMS device of claim 1, wherein the reflective element comprises end portions that are thinner than a center portion.

14. The MEMS device of claim 13, wherein at least a portion of the reflective element is conductive.

15. The MEMS device of claim 1, wherein the reflective element comprises one or more extensions above an upper surface of the reflective element and extending toward the second electrode.

16. The MEMS device of claim 15, wherein the one or more extensions are on or near one or more edge portions of the reflective element and have a height above the upper surface of the reflective element that is about ⅓ to about ½ of a thickness of a central portion of the reflective element.

17. The MEMS device of claim 1, wherein the second electrode comprises one or more portions extending toward the reflective element.

18. The MEMS device of claim 1, wherein the third electrode comprises one or more portions extending toward the reflective element.

19. The MEMS device of claim 1, further comprising:

a display;

a processor that is configured to communicate with said display, said processor being configured to process image data; and a memory device that is configured to communicate with said processor.

20. The MEMS device of claim 19, further comprising a driver circuit configured to send at least one signal to said display.

21. The MEMS device of claim 20, further comprising a controller configured to send at least a portion of said image data to said driver circuit.

22. The MEMS device of claim 19, further comprising an image source module configured to send said image data to said processor.

23. The MEMS device of claim 22 wherein said image source module comprises at least one of a receiver, transceiver, and transmitter.

24. The MEMS device of claim 19, further comprising an input device configured to receive input data and to communicate said input data to said processor.

25. The MEMS device of claim 1, wherein the optical stack comprises an optical layer that is partially transparent or translucent and partially reflective to the light and a dielectric layer that is partially transparent or translucent to the light, the dielectric layer over the optical layer, wherein when the reflective element is in the first position, the dielectric layer comprises the portion of the optical stack in contact with the reflective element.

26. The MEMS device of claim 1, wherein the device has a first reflectivity when the reflective element is in the first position and a second reflectivity when the reflective element is in the second position, the first reflectivity different from the second reflectivity.

27. A microelectromechanical system (MEMS) device comprising:

a first means for conducting electricity;

a second means for conducting electricity, the second conducting means electrically insulated from the first conducting means;

a third means for conducting electricity, the third conducting means electrically insulated from the first conducting means and the second conducting means;

means for separating the first conducting means from the second conducting means, the third conducting means comprising a conductive portion of the separating means;

a first means for reflecting light, wherein the first reflecting means comprises the first conducting means and is partially transparent or translucent and at least partially reflective of light; and a second means for reflecting light, wherein the first reflecting means and the second reflecting means define an interferometric optical cavity between the first reflecting means and the second reflecting means, the second reflecting means movable relative to the first reflecting means to modulate optical interference of the light by the interferometric optical cavity;

wherein the second reflecting means is located between a first position and a second position, the second reflecting means movable between the first position and the second position upon application of a voltage difference between the first conducting means and the second conducting means, the second reflecting means in contact with a portion of the first reflecting means when in the first position and not in contact with the portion of the first reflecting means when in the second position;

wherein an adhesive force is generated between the second reflecting means and the portion when the second reflecting means is in the first position, and wherein voltages applied to the first conducting means, the second conducting means, and the third conducting means at least partially reduce or counteract the adhesive force while the second reflecting means is in the first position.

28. The MEMS device of claim 27, wherein the first conducting means comprises an electrode.

29. The MEMS device of claim 27, wherein the second conducting means comprises an electrode.

30. The MEMS device of claim 27, wherein the third conducting means comprises an electrode.

31. The MEMS device of claim 30, wherein at least a portion of the electrode is higher than the second reflecting means when the second reflecting means is in the first position.

32. The MEMS device of claim 31, wherein at least a portion of the electrode is directly above at least a portion of the second reflecting means when the second reflecting means is in the first position.

33. The MEMS device of claim 30, wherein the electrode is supported by the separating means.

34. The MEMS device of claim 27, wherein the separating means comprises a mechanical layer and one or more support posts.

35. The MEMS device of claim 27, wherein the second reflecting means comprises a reflective element disposed between the first conducting means and the second conducting means.

36. The MEMS device of claim 27, wherein the first reflecting means comprises an optical layer that is partially transparent or translucent and partially reflective to the light and a dielectric layer that is partially transparent or translucent to the light, the dielectric layer over the optical layer, wherein when the second reflecting means is in the first position, the dielectric layer comprises the portion of the first reflecting means in contact with the second reflecting means.

37. The MEMS device of claim 27, wherein the device has a first reflectivity when the second reflecting means is in the first position and a second reflectivity when the second reflecting means is in the second position, the first reflectivity different from the second reflectivity.

38. A method of operating a microelectromechanical system (MEMS) device, the method comprising:

providing a MEMS device comprising:

a first electrode;

a second electrode electrically insulated from the first electrode;

a third electrode electrically insulated from the first electrode and the second electrode;

a support structure which separates the first electrode from the second electrode, the third electrode comprising a conductive portion of the support structure;

an optical stack comprising the first electrode, wherein the optical stack is partially transparent or translucent and at least partially reflective of light; and a movable reflective element, wherein the optical stack and the reflective element define an interferometric optical cavity between the optical stack and the reflective element, the reflective element movable relative to the optical stack to modulate optical interference of the light by the interferometric optical cavity;

the reflective element located between a first position and a second position, the reflective element movable between the first position and the second position upon application of a voltage difference between the first electrode and the second electrode, the reflective element in contact with a portion of the optical stack when in the first position and not in contact with the portion of the optical stack when in the second position, wherein an adhesive force is generated between the reflective element and the portion when the reflective element is in the first position;

and applying voltages to the first electrode, the second electrode, and the third electrode to at least partially reduce or counteract the adhesive force.

39. The method of claim 38, wherein the voltages have magnitudes between about 10 Volts and about 50 Volts.

40. The method of claim 38, wherein the voltages applied to the first, second, and third electrodes causes a portion of the reflective element to undergo an elastic deformation.

41. The method of claim 38, wherein at least one of the voltages applied to the first, second, and third electrodes comprises a time-varying voltage having a frequency.

42. The method of claim 41, wherein the frequency is in a range from about 100 Hz to about 50 MHz.

43. The method of claim 41, wherein the frequency is substantially equal to a mechanical resonant frequency of the reflective element.

44. The method of claim 41, wherein the time-varying voltage causes a portion of the reflective element to undergo an elastic oscillation.

45. The method of claim 44, wherein the frequency is selected to provide an increased amplitude of the elastic oscillation.

46. The method of claim 38, wherein the voltages applied to the first, second, and third electrodes decrease an area of the reflective element in contact with the portion of the optical stack when in the first position by elastically deforming the reflective element.

47. The method of claim 38, wherein at least one of the voltages applied to the first, second, and third electrodes comprises a time-varying voltage which applies an impulse to the reflective element.

48. A method of manufacturing a microelectromechanical system (MEMS) device comprising:

forming a first reflective layer on a substrate;

forming a sacrificial layer over the first reflective layer;

removing a portion of the sacrificial layer to form an opening;

filling the opening with a dielectric material to form a post;

forming a second reflective layer over the sacrificial layer;

removing a portion of the second reflective layer and a portion of the post to form a hole;

filling the hole with a conductive material to form an electrode; and removing the sacrificial layer.

49. The method of claim 48, wherein the second reflective layer is located and movable between a first position and a second position, the second reflective layer in contact with a portion of the device when in the first position and not in contact with the portion of the device when in the second position, wherein at least a portion of the electrode is higher than the second reflective layer when the second reflective layer is in the first position.

50. The method of claim 49, wherein at least a portion of the electrode is directly above at least a portion of the second reflective layer when the second reflective layer is in the first position.

51. The method of claim 48, wherein the electrode is at least partially supported by the post.

* * * * *